United States Patent
Shibata et al.

(10) Patent No.: US 8,692,962 B2
(45) Date of Patent: Apr. 8, 2014

(54) DIFFUSION SHEET AND METHOD OF MANUFACTURING THE SAME, BACKLIGHT, AND LIQUID CRYSTAL DISPLAY DEVICE

(75) Inventors: Akihiro Shibata, Miyagi (JP); Jun Sasaki, Miyagi (JP); Hirofumi Tsuiki, Miyagi (JP); Akihiro Horii, Miyagi (JP); Noriyuki Hirai, Miyagi (JP); Hiroshi Mizuno, Miyagi (JP); Satoko Asaoka, Miyagi (JP); Kanako Hashimoto, Miyagi (JP); Yasuyuki Kudo, Miyagi (JP); Saori Hayashi, Kanagawa (JP); Teiichi Miyauchi, Kanagawa (JP); Satoshi Sekino, Miyagi (JP); Makoto Aoki, Miyagi (JP)

(73) Assignee: Sony Corporation, Tokyo (JP)

( * ) Notice: Subject to any disclaimer, the term of this patent is extended or adjusted under 35 U.S.C. 154(b) by 535 days.

(21) Appl. No.: 12/785,641

(22) Filed: May 24, 2010

(65) Prior Publication Data

US 2010/0309411 A1    Dec. 9, 2010

(30) Foreign Application Priority Data

Jun. 7, 2009  (JP) ................................ P2009-136767
Jan. 27, 2010 (JP) ................................ P2010-015978

(51) Int. Cl.
*G02F 1/1335* (2006.01)
*G02B 5/04* (2006.01)

(52) U.S. Cl.
CPC ..................................... *G02B 5/045* (2013.01)
USPC .......................................... 349/112; 349/64

(58) Field of Classification Search
CPC ..................... G02B 5/045; H01L 2224/45144
USPC ....................................................... 349/64, 112
See application file for complete search history.

(56) References Cited

U.S. PATENT DOCUMENTS

| | | | |
|---|---|---|---|
| 6,436,265 B1 * | 8/2002 | Shimada et al. | 205/125 |
| 6,852,396 B1 | 2/2005 | Mineo | |
| 7,344,282 B2 | 3/2008 | Kim et al. | |
| 7,645,057 B2 | 1/2010 | Kim et al. | |
| 2009/0021667 A1 * | 1/2009 | Horiguchi et al. | 349/64 |

FOREIGN PATENT DOCUMENTS

| | | |
|---|---|---|
| JP | 2000-89007 | 3/2000 |
| JP | 2004-021209 | 1/2004 |
| JP | 2004-126376 | 4/2004 |
| JP | 2004-309557 | 11/2004 |
| JP | 2006-301582 | 11/2006 |
| JP | 2007-304219 | 11/2007 |
| JP | 2008-083685 | 4/2008 |
| JP | 4294306 | 4/2009 |

OTHER PUBLICATIONS

Japanese Office Action issued Dec. 17, 2013 in corresponding Japanese Patent Application No. 2010-015978.

* cited by examiner

*Primary Examiner* — Lucy Chien
(74) *Attorney, Agent, or Firm* — K&L Gates LLP

(57) ABSTRACT

A diffusion sheet includes: a substrate having a first principal surface and a second principal surface; and structures each in a convex shape formed randomly on the first principal surface or the second principal surface of the substrate. The structures have an identical or almost identical height. The structures have an aspect ratio h/r, where r denotes an average radius of the structures and h denotes an average height of the structures, of more than 0.85 and not more than 1.50. The structures have a filling factor of not less than 60% and not more than 80%.

15 Claims, 21 Drawing Sheets

DIFFUSION SHEET AND METHOD OF MANUFACTURING THE SAME, BACKLIGHT, AND LIQUID CRYSTAL DISPLAY DEVICE

CROSS REFERENCES TO RELATED APPLICATIONS

The present application claims to Japanese Priority Patent Application JP 2009-136767 filed in the Japan Patent Office on Jun. 7, 2009, and Japanese Priority Patent Application JP 2010-015978 filed in the Japan Patent Office on Jan. 27, 2010, the entire contents of which are hereby incorporated by reference.

BACKGROUND

The present application relates to a diffusion sheet, a method of manufacturing the diffusion sheet, and a backlight and a liquid crystal display device that are provided with the diffusion sheet. Specifically, it relates to a diffusion sheet with structures each in a convex shape formed on a surface thereof.

In the past, a variety of optical sheets are used for backlights mounted in liquid crystal display devices. Among such a variety of optical sheets, one of the most important ones includes diffusion sheets. As such a diffusion sheet, those widely used are provided with a sheet formed of a resin material, such as polyethylene terephthalate, and a diffusion layer formed by applying a resin composition having resin beads dispersed therein on a sheet and curing it (for example, refer to Japanese Unexamined Patent Application Publication No. 2000-89007). In a diffusion sheet having such a configuration, light incident from a light source is diffused and collected by resin beads contained in the diffusion layer.

In recent years, with the improvement in the aperture ratio of liquid crystal panels, lens sheets have been desired to be replaced with diffusion sheets. However, the diffusion sheets in the past described above may be insufficient in luminance, and improvement in the luminance of diffusion sheets is strongly desired.

SUMMARY

Accordingly, it is desirable to provide a diffusion sheet capable of improving luminance, a method of manufacturing the diffusion sheet, and a backlight and a liquid crystal display device that are provided with the diffusion sheet.

According to an embodiment, a diffusion sheet includes:
a substrate having a first principal surface and a second principal surface; and
structures each in a convex shape formed randomly on the first principal surface or the second principal surface of the substrate; wherein
the structures have an identical or almost identical height,
the structures have an aspect ratio h/r, where r denotes an average radius of the structures and h denotes an average height of the structures, of more than 0.85 and not more than 1.50, and
the structures have a filling factor of not less than 60% and not more than 80%.

According to another embodiment, a diffusion sheet includes:
a substrate having a first principal surface and a second principal surface; and
structures each in a convex shape formed randomly on the first principal surface or the second principal surface of the substrate; wherein
the structures have an identical or almost identical height,
the structures have an aspect ratio h/r, where r denotes an average radius of the structures and h denotes an average height of the structures, of more than 0.50 and not more than 1.50, and
the structures have a filling factor of not less than 60% and not more than 80%.

According to still another embodiment, a backlight includes:
one or a plurality of light sources; and
one or a plurality of diffusion sheets; wherein
the diffusion sheets include
a substrate having a first principal surface and a second principal surface, and
structures each in a convex shape formed randomly on the first principal surface or the second principal surface of the substrate,
the structures have an identical or almost identical height,
the structures have an aspect ratio h/r, where r denotes an average radius of the structures and h denotes an average height of the structures, of more than 0.85 and not more than 1.50, and
the structures have a filling factor of not less than 60% and not more than 80%.

According to yet another embodiment, a backlight includes:
one or a plurality of light sources; and
a plurality of optical sheets; wherein
the plurality of optical sheets includes at least one diffusion sheet,
the diffusion sheet includes
a substrate having a first principal surface and a second principal surface, and
structures each in a convex shape formed randomly on the first principal surface or the second principal surface of the substrate,
the structures have an identical or almost identical height,
the structures have an aspect ratio h/r, where r denotes an average radius of the structures and h denotes an average height of the structures, of more than 0.50 and not more than 1.50, and
the structures have a filling factor of not less than 60% and not more than 80%.

According to yet another embodiment, a method of manufacturing a diffusion sheet includes the steps of:
forming a random exposure pattern in a resist layer formed on a surface of a matrix fabrication substrate;
forming apertures of a random pattern in the resist layer by developing the resist layer with the random exposure pattern formed therein;
fabricating a matrix having concave portions by etching the matrix fabrication substrate using the resist layer with the apertures formed therein as a mask; and
fabricating a diffusion sheet with structures each in a convex shape by pattern transferring the concave portions of the matrix to the first principal surface or the second principal surface of the substrate; wherein
the structures have an identical or almost identical height,
the structures have an aspect ratio h/r, where r denotes an average radius of the structures and h denotes an average height of the structures, of more than 0.85 and not more than 1.50, and
the structures have a filling factor of not less than 60% and not more than 80%.

According to yet another embodiment, a method of manufacturing a diffusion sheet includes the steps of:
forming a random exposure pattern in a resist layer formed on a surface of a matrix fabrication substrate;

forming apertures of a random pattern in the resist layer by developing the resist layer with the random exposure pattern formed therein;

fabricating a matrix having concave portions by etching the matrix fabrication substrate using the resist layer with the apertures formed therein as a mask; and fabricating a diffusion sheet with structures each in a convex shape by pattern transferring the concave portions of the matrix to the first principal surface or the second principal surface of the substrate; wherein the structures have an identical or almost identical height, the structures have an aspect ratio h/r, where r denotes an average radius of the structures and h denotes an average height of the structures, of more than 0.50 and not more than 1.50, and the structures have a filling factor of not less than 60% and not more than 80%.

In an embodiment firstly, thirdly, and fifthly mentioned above, since the structures of the diffusion sheet are randomly formed on the first or second principal surface of the substrate, generation of moire can be suppressed. Since the structures are formed with an identical or almost identical height, the luminance can be improved. Since the aspect ratio h/r (r: average radius of structures, h: average height of structures) of the structures is more than 0.85 and not more than 1.50, it is possible to improve the luminance when using one or a plurality of diffusion sheets for a backlight and also improve the transferability of the structures. Since the areal filling factor of the structures is not less than 60% and not more than 80%, it is possible to improve the luminance and also suppress the generation of moire.

In an embodiment, since the structures of the diffusion sheet are randomly formed on the first or second principal surface of the substrate, it is possible to suppress the generation of moire. Since the structures are formed with an identical or almost identical height, it is possible to improve the luminance. Since the aspect ratio h/r (r: average radius of structures, h: average height of structures) of the structures is more than 0.50 and not more than 1.50, it is possible to improve the luminance when using a plurality of optical sheets, including at least one diffusion sheet, for a backlight and also improve the transferability of the structures. Since the areal filling factor of the structures is not less than 60% and not more than 80%, it is possible to improve the luminance and also suppress the generation of moire.

As described above, with a diffusion sheet according to an embodiment of, an excellent light collection function can be obtained. Accordingly, by providing the diffusion sheet mentioned above in a backlight or a liquid crystal display device, the luminance can be improved.

Additional features and advantages are described herein, and will be apparent from the following Detailed Description and the figures.

DETAILED DESCRIPTION

Figure 1A:
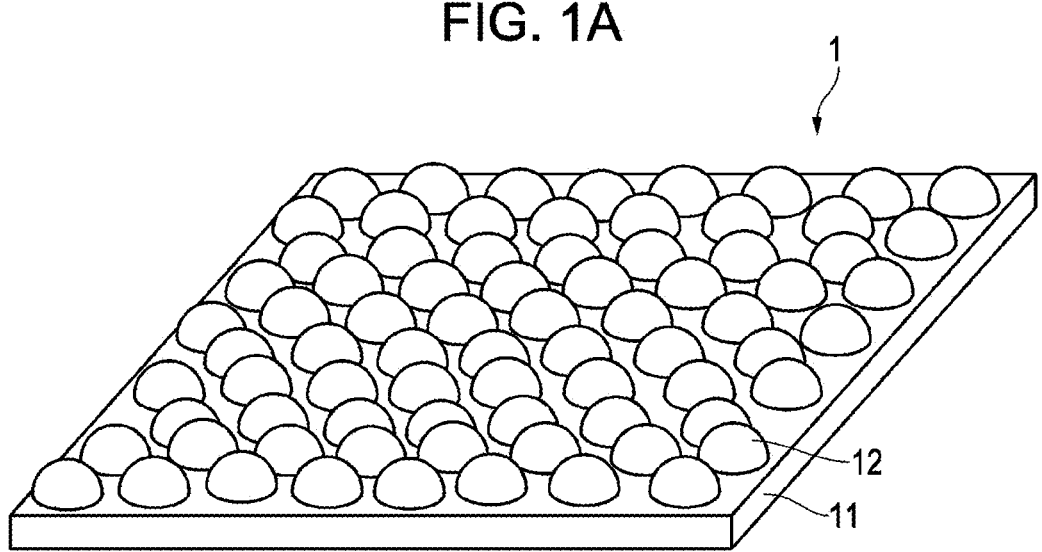
FIG. 1A is a partially enlarged perspective view illustrating a diffusion sheet according to an embodiment.

The present application is described in detail below with reference to the drawings according to an embodiment. In all drawings of the embodiments below, identical reference numerals and characters denote identical or corresponding portions.

1. Embodiment Example of Diffusion Sheet
2. Another Embodiment Example of Applying Diffusion Sheet to Liquid Crystal Display Device

1. Embodiment

1.1. Configuration of Diffusion Sheet

Figure 1B:
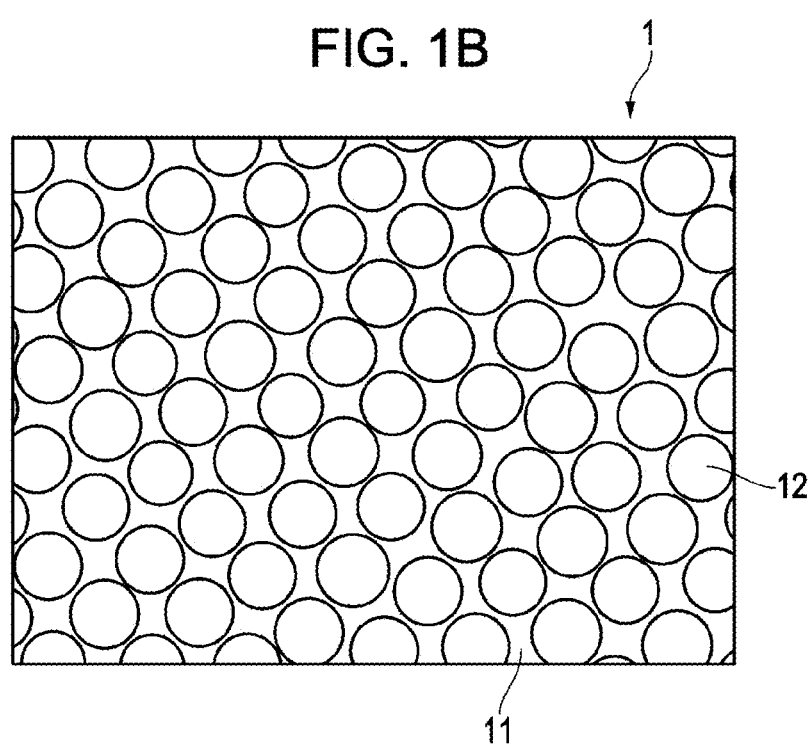
FIG. 1B is a partially enlarged plan view illustrating the diffusion sheet according to this embodiment.

FIG. 1A is a partially enlarged perspective view illustrating a diffusion sheet according to an embodiment. FIG. 1B is a partially enlarged plan view illustrating the diffusion sheet according to this embodiment. As illustrated in FIGS. 1A and 1B, a diffusion sheet 1 is provided with a substrate 11 having both principal surfaces (first principal surface and second principal surface) and structures 12 each in a convex shape formed on one of the both principal surfaces of the substrate 11. In the diffusion sheet 1, functions of diffusion, light collection, and the like are imparted to the interfaces of the structures 12.

Substrate

As the substrate 11, a sheet with transparency or the like can be used, for example. Here, a sheet is defined to include a film. As a material for the substrate 11, polymeric materials of related art can be used, for example. Specifically, such a polymeric material of related art includes, for example, triacetyl celluloses (TAC), polyesters (TPEE), polyethylene terephthalates (PET), polyimides (PI), polyamides (PA), aramids, polyethylenes (PE), polyacrylates, polyethersulfones, polysulfones, polypropylenes (PP), diacetyl celluloses, polyvinyl chlorides, acrylic resins (PMMA), polycarbonates (PC), epoxy resins, urea resins, urethane resins, melamine resins, and the like. The substrate 11 may also further contain, as desired, fillers, plasticizers, stabilizers, antioxidants, dispersants, flame retardants, ultraviolet absorbers, and the like. Although the thickness of the substrate 11 is preferably from 38 to 100 μm from a perspective of productivity, it is not particularly limited to this range.

Structures

The structures 12 each in a convex shape are formed randomly (irregularly) on one principal surface of the substrate 11. The structures 12 are preferably formed integrally with the one principal surface of the substrate 11. That is, the diffusion sheet 1 preferably has a single layer structure. By employing such a structure, since there is no interface reflection different from diffusion sheets of a multilayer structure, the luminance can be improved. The resin configuring the diffusion sheet 1 can also be used by recycling. In a case of forming the structures 12 integrally with the substrate 11 in such a manner, the structures 12 and the substrate 11 preferably contain an identical thermoplastic resin.

Each structure 12 formed on the one principal surface of the substrate 11 is preferably in an almost identical shape. The shape of each structure 12 is preferably in a partially spherical shape. The partially spherical shape is a shape of partially cutting out a spherical shape. The partially spherical shape is preferably smaller than a hemisphere considering the demoldability of the structures during a manufacturing process described later. In addition, the partially spherical shape is defined to include almost partially spherical shapes. Here, the almost partially spherical shapes are shapes of slightly deforming a partially spherical shape to the extent of not leading a serious decrease of optical characteristics, such as luminance, compared to a case of a partially spherical shape.

Figure 2A:
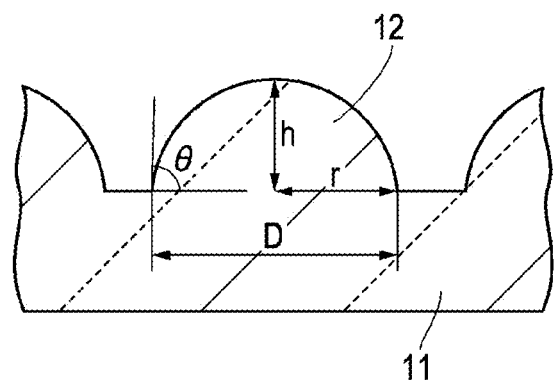
FIG. 2A is a schematic view illustrating a shape of structures.

FIG. 2A is a schematic view illustrating a shape of structures 12. The size of the structures 12 is preferably selected in correspondence with a method of transferring the pattern of the structures 12. In a case of using melt extrusion molding as a method of pattern transfer, an average diameter D of circular bottom faces of the structures 12 is preferably not less than 50 μm and not more than 100 μm. When the average diameter D is less than 50 μm, the transferability is prone to decrease. On the other hand, when the average diameter D is more than 100 μm, the visibility is prone to decrease upon implementing the diffusion sheet 1 in a liquid crystal display device. In a case of using lamination transfer molding as a method of pattern transfer, the average diameter D of the circular bottom faces of the structures 12 is preferably not less than 20 μm and not more than 50 μm When the average diameter D is less than 20 μm, matrix fabrication is prone to become difficult. On the other hand, when the average diameter D is more than 50 μm, the transferability is prone to decrease. Here, the melt extrusion molding is a method of transferring the pattern by extruding a heated and molten resin in a sheet form to transfer the concavity and convexity in a roller matrix. The lamination transfer molding is a method of transferring the pattern by thermally transferring the concavity and convexity in an embossing belt to a sheet. Details of molding apparatuses employing these molding methods are described later.

The aspect ratio h/r (r: average radius of structures, h: average height of structures) of the structures 12 is more than 0.85 and not more than 1.50, preferably not less than 0.95 and not more than 1.10. When the aspect ratio h/r is not more than 0.85, the luminance is prone to decrease when using one or a plurality of diffusion sheets 1 for a backlight. On the other hand, when the aspect ratio h/r is more than 1.50, the transferability is prone to decrease. In a case of using a plurality of diffusion sheets 1 for a backlight, the aspect ratio h/r of the diffusion sheet 1 disposed most distant from the light source among the plurality of diffusion sheets 1 is preferably largest among those of the plurality of diffusion sheets 1. This is because the change of the aspect in the diffusion sheet 1 disposed most distant from the light source influences the luminance of the backlight most largely.

The aspect ratio h/r (r: average radius of structures, h: average height of structures) of the structures 12 is more than 0.50 and not more than 1.50 and is preferably not less than 0.55 and not more than 1.10. When the aspect ratio h/r is not more than 0.50, the luminance is prone to decrease when using three or more diffusion sheets 1 for a backlight. On the other hand, when the aspect ratio h/r is more than 1.50, the transferability is prone to decrease. In a case of using three or more diffusion sheets 1 for a backlight, the aspect ratio h/r of the diffusion sheet 1 disposed most distant from the light source among the three or more diffusion sheets 1 is preferably largest among those of the three or more diffusion sheets 1. This is because the change of the aspect in the diffusion sheet 1 disposed most distant from the light source influences the luminance of the backlight most largely.

The side face angle θ of each structure 12 near the boundary with the one principal surface of the substrate 11 is preferably not less than 65 degrees and not more than 90 degrees. When the side face angle θ is less than 65 degrees, the luminance is prone to decrease seriously. The side face angle θ is preferably at approximately 70 degrees±2 degrees to obtain higher luminance. On the other hand, when the side face angle θ is more than 90 degrees, the demoldability of the structures 12 is prone to become difficult. The side face angle θ of each structure 12 near the boundary with the one principal surface of the substrate 11 is an angle, when cutting any of the structures 12 through the central axis thereof, between tangents of the outline of the structure 12 and the outline of the flat portion near the intersection between the outline of the structure 12 and the outline of the flat portion in the section.

Figure 2B:
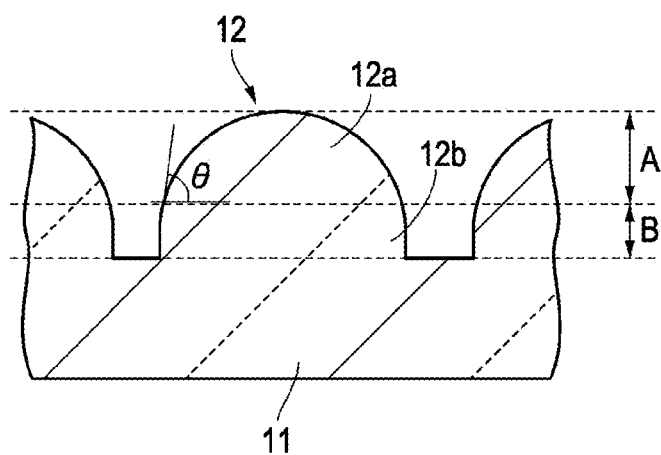
FIG. 2B is a schematic view illustrating a shape of structures provided with a base portion.

As illustrated in FIG. 2B, each structure 12 is preferably provided with a main body 12a with a lens function and a base portion 12b extending from a bottom face of the main body 12a towards the substrate 11. By having the base portion 12b in such a manner, the main body 12a of each structure 12 can be in a hemisphere or a shape closer to a hemisphere even in a case that the heights of the structures 12 vary. That is, as described above, the side face angles θ of the structures 12 can be in an angular range of not less than 65 degrees and not more than 90 degrees near the boundary with the one principal surface of the substrate 11. Accordingly, the luminance of the diffusion sheet 1 can be improved. The shape of the main body 12a is preferably in a partially spherical shape. Here, the main body 12a is a part A, which has an angle of the tangents between the outline of the respective structure 12 and the outline of the flat portion between such structures 12 in a range of not less than 0 degrees and not more than 85 degrees in a case of viewing the structure 12 and the flat portion between such structures 12 from within the plane of the diffusion sheet 1. The base portion 12b is a part B, which has an angle of the tangents between the outline of the respective structure 12 and the outline of the flat portion between such structures 12 in a range of more than 85 degrees and not more than 90 degrees in a case of viewing the structure 12 and the flat portion between such structures 12 from within the plane of the diffusion sheet 1.

An average length l (height of each part B from the one principal surface of the substrate 11) of the base portions 12b is preferably $0 < l \leq 20$ μm. By establishing the average length l of the base portions 12b as $0 < l$, the main bodies 12a of the structures 12 can be in a hemisphere or a shape closer to a hemisphere even in a case that the heights of the structures 12 vary as described above. By establishing the average length l of the base portions 12b as $l \leq 20$ μm, the decrease of the transferability can be suppressed.

The filling factor of each structure 12 is preferably not less than 60% and not more than 80%. When the filling factor is less than 60%, the luminance is prone to decrease. On the other hand, when the filling factor is more than 80%, moire is prone to be generated. Here, the moire denotes moire generated when laminating a plurality of diffusion sheets 1, moire with panel pixels generated when using the diffusion sheet 1 in combination with a liquid crystal panel, or moire with a diffuser panel pitch generated when using the diffusion sheet 1 in combination with a diffuser panel.

The structures 12 have an identical or almost identical height. A variation K of the structures 12 preferably satisfies a relationship of $0\% < K \leq 10\%$, more preferably $0\% < K \leq 8\%$. By establishing the variation K of the structures 12 in such a range, the luminance of the diffusion sheet 1 can be improved.

1.2. Method of Manufacturing Diffusion Sheet

Next, referring to FIGS. 3A through 3F, a description is given to one example of a method of manufacturing a diffusion sheet according to this embodiment.

Process of Forming Resist Layer

Figure 3A:
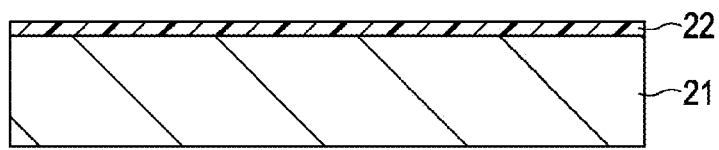
FIGS. 3A through 3F are process drawings illustrating one example of a method of manufacturing a diffusion sheet according to this embodiment.

Firstly, a resist layer 22 is formed on a surface of a matrix fabrication substrate 21, subjected to the process (refer to FIG. 3A). The shape of the matrix fabrication substrate 21, subjected to the process, includes plate forms, sheet forms, film forms, brick forms, solid cylindrical forms, cylindrical forms, annular forms, and the like, for example. As a material for the resist layer 22, either inorganic or organic resists can be used, for example. In a case that the matrix fabrication substrate 21 is in a solid cylindrical or cylindrical form, the resist layer 22 is preferably formed on an outer circumferential face thereof.

Process of Exposure

Figure 3B:
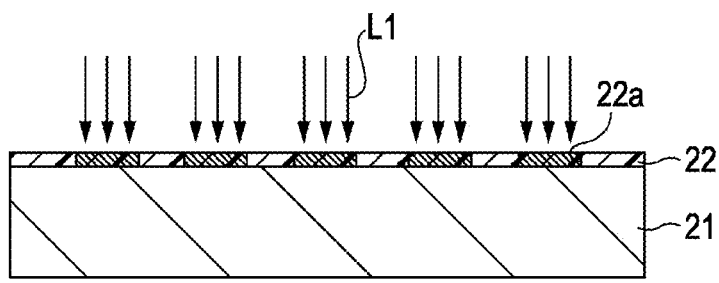

Next, by irradiating light L1, such as a laser light, for example, to the resist layer 22, exposed portions 22a are randomly formed in the resist layer 22 (refer to FIG. 3B). The shape of the exposed portions 22a formed in the resist layer 22 may include, for example, a circular shape and almost circular shape. In a case of forming the exposed portions 22a in such a shape, the size of the exposed portions 22a is preferably selected in correspondence with the type of the method of transfer used for a process of pattern transfer described later. For example, in a case of using melt extrusion molding as the method of transfer, the average diameter D of the bottom faces of the exposed portions 22a is preferably not less than 50 μm and not more than 100 μm. In a case of using lamination transfer molding as the method of transfer, the average diameter D of the bottom faces of the structures 12 is preferably not less than 20 μm and not more than 50 μm.

Process of Development

Figure 3C:
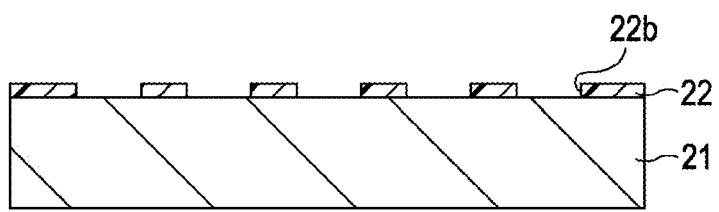
Figure 3D:
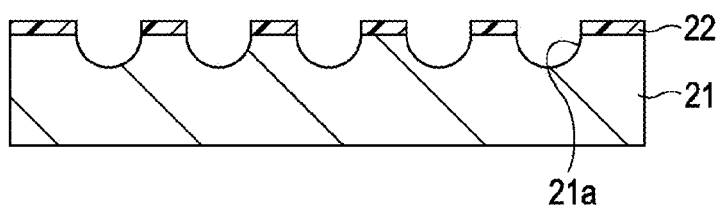

Next, the resist layer 22 is developed in which the exposed portions 22a are formed. This enables to form apertures 22b corresponding to the exposed portions 22a in the resist layer 22 (refer to FIG. 3C). In FIG. 3C, although an example is shown in which positive resists are used as the resists to form the apertures 22b in the exposed portions 22a, the resists are not limited to this example. That is, negative resists may also be used as the resists to leave the exposed portions.

Process of Etching

Next, using the resist layer 22 with the apertures 22b formed therein as masks, a surface of the matrix fabrication substrate 21 is etched. This enables to form concave portions 21a with an identical or almost identical depth on the surface of the matrix fabrication substrate 21 (refer to FIG. 3D). Although either dry etching or wet etching, for example, may be used for the etching, wet etching is preferably used from the point of simple facilities. In addition, either isotropic etching or anisotropic etching, for example, may be used as the etching and is preferably selected appropriately in correspondence with the shape of the desired structures 12.

Process of Resist Removal

Figure 3E:
Figure 3F:
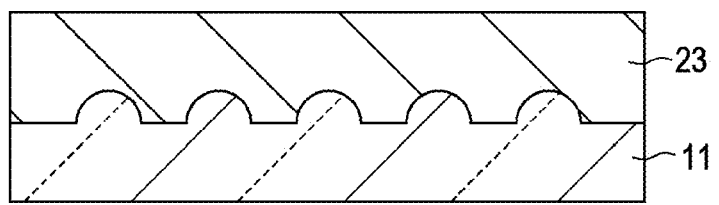

Next, the resist layer 22 formed on the surface of the matrix fabrication substrate 21 is removed by ashing or the like (refer to FIG. 3E). This enables to obtain a matrix 23 having concave portions 21a, which is an inverted shape of the structures 12.

Process of Plating

Next, the concave and convex plane of the matrix 23 may be plated as desired to form a plated layer of nickel plating or the like.

Process of Pattern Transfer

Next, the fabricated matrix 23 is loaded into a molding apparatus, such as a melt extruder or a lamination transfer molding apparatus, for example. Next, the shape of the concave portions 21a of the matrix 23 is pattern transferred to the one principal surface of the substrate 11 (refer to FIG. 3F). This enables to form the structures 12 each in a convex shape on the one principal surface of the substrate 11. The details of the configurations of such a melt extruder and a lamination transfer molding apparatus are described later.

In the above manner, the intended diffusion sheet 1 is obtained.

1.3. Apparatus of Molding Diffusion Sheet

First Example of Molding Apparatus

Figure 4A:
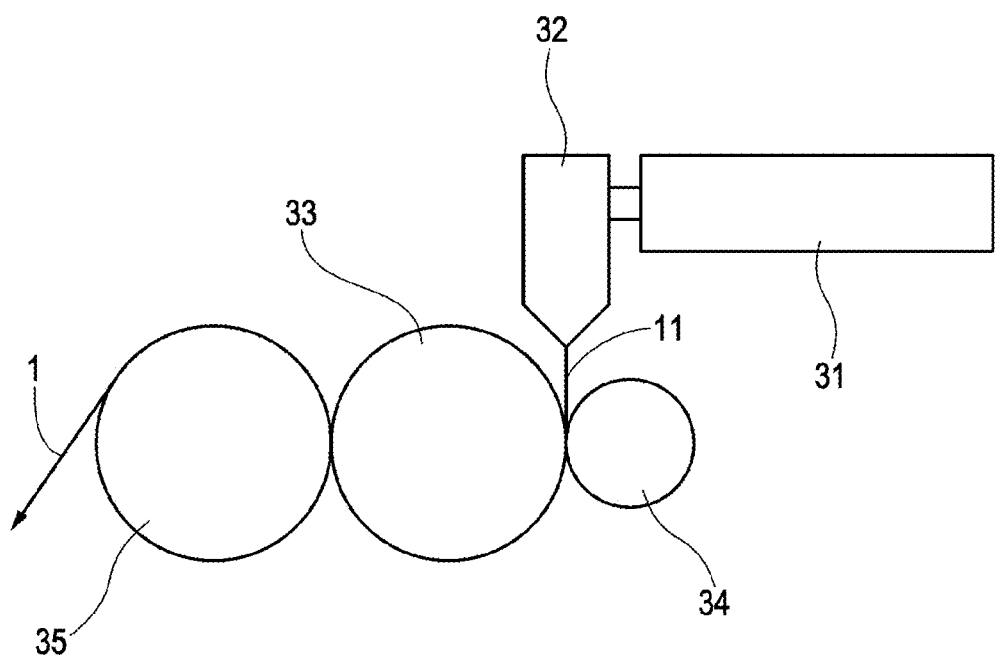
FIG. 4A is a schematic view illustrating one configuration example of a melt extruder.

FIG. 4A is a schematic view illustrating one configuration example of a melt extruder. As illustrated in FIG. 4A, the melt extruder is provided with an extruder 31, a T die 32, a forming roller 33, an elastic roller 34, and a cold roller 35. Here, the forming roller 33 is one example of the matrix 23 described above.

The extruder 31 melts a resin material supplied from a hopper, not shown, to supply it to the T die 32. The T die 32 is a die having an I-shaped aperture and spreads the resin material supplied from the extruder 31 up to an intended sheet width to discharge it.

The forming roller 33 has a solid cylindrical shape and is configured to be capable of rotary driving with the central axis as a rotation axis. The forming roller 33 is also configured to be coolable. Specifically, the forming roller 33 has one or not less than two flow passages therein to flow a cooling medium, such as an oil medium.

A concave and convex shape to transfer a fine pattern to a sheet discharged from the T die 32 is provided on the solid cylindrical face of the forming roller 33. The concave and convex shape is a fine concave and convex shape to transfer the structures 12 to the substrate 11, for example. The concave and convex shape is preferably formed by a combination of a photolithography process and an etching process as described above. This is because the variation of the heights in the structures 12 can be suppressed.

The elastic roller 34 has a solid cylindrical shape and is configured to be capable of rotary driving with the central axis as a rotation axis. The elastic roller 34 is also configured to have an elastically deformable surface, and in a case of nipping the sheet by the forming roller 33 and the elastic roller 34, has the side making contact with the forming roller 33 to be crushed.

The elastic roller 34 is covered by a seamless tube formed of, for example, Ni plating or the like and is provided with an elastic body therein to enable elastically deformation of the surface of the elastic roller 34. The elastic roller 34 is not limited in the configuration and the material as long as the surface is elastically deformable when contacting the forming roller 33 at a predetermined pressure. As the material, for example, rubber materials, metals, composite materials, or the like may be used. The elastic roller 34 is not limited to those in a rolled shape, and may use those in a belt shape. The elastic roller 34 is configured to be coolable. Specifically, the elastic roller 34 has one or not less than two flow passages therein to flow a cooling medium, such as water.

The cold roller 35 has a solid cylindrical shape and is configured to be capable of rotary driving with the central axis as a rotation axis. The cold roller 35 is configured to be coolable. Specifically, the cold roller 35 has one or not less than two flow passages therein to flow a cooling medium, such as water.

Next, a description is given to behaviors of the melt extruder with the configuration described above.

Firstly, a resin material is melted by the extruder 31 to be sequentially supplied to the T die 32, and a sheet is continuously discharged from the T die 32. Next, the sheet discharged from the T die 32 is nipped by the forming roller 33 and the elastic roller 34. This enables to transfer the concave and convex shape of the forming roller 33 to the resin material. Next, while suppressing the flapping by nipping the substrate 11 by the forming roller 33 and the cold roller 35, the substrate 11 is removed from the forming roller 33 by cold roller 35.

In the above manner, the intended diffusion sheet 1 can be obtained.

Second Example of Molding Apparatus

Figure 4B:
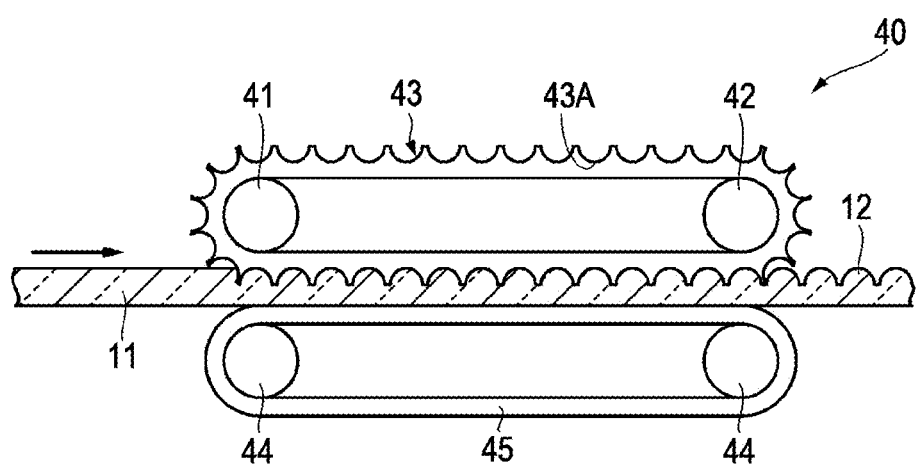
FIG. 4B is a schematic view illustrating one configuration example of a lamination transfer molding apparatus.

FIG. 4B is a schematic view illustrating one configuration example of a lamination transfer molding apparatus. The lamination transfer molding apparatus 40 is provided with an embossing belt 43 rotated by a heating roller 41 and a cold roller 42, and a flat belt 45 rotated by two pressing rollers 44 disposed facing the heating roller 41 and the cold roller 42. Then, the substrate 11 before imparting the pattern can be inserted in a gap between the embossing belt 43 having a plurality of concave portions 43A on the surface and the flat belt 45 without a steric pattern. Here, the embossing belt 43 is one example of the matrix 23 described above.

Next, a description is given to behaviors of a lamination transfer molding apparatus with the configuration described above.

Firstly, by rotating the embossing belt 43 and the flat belt 45, the substrate 11 before imparting a pattern is inserted from the side of the heating roller 41 in the gap between the belts. This makes the one principal surface of the substrate 11 to melt only for a moment due to the heat of the heating roller 41 to transfer the pattern of the concave portions 43A to the one principal surface of the substrate 11. After that, the surface of the substrate 11 to which the concave portions 43A are pattern transferred is cooled by the cold roller 42 to fix the surface pattern. That is, the plurality of structures 12 is formed on the one principal surface of the substrate 11.

In the above manner, the intended diffusion sheet 1 can be obtained.

According to this embodiment, since the structures 12 are randomly formed on the one principal surface of the substrate 11, generation of moire can be suppressed. Since the structures 12 are formed with an identical or almost identical height, the luminance can be improved. Since the aspect ratio h/r (r: average radius of structures, h: average height of structures) of the structures 12 is more than 0.85 and not more than 1.50, the luminance can be improved and also the transferability of the structures 12 can be improved. Since the areal filling factor of each structure 12 is not less than 60% and not more than 80%, the luminance can be improved and also the generation of moire can be suppressed.

2. Another Embodiment

Configuration of Liquid Crystal Display Device

First Configuration Example

Figure 5A:
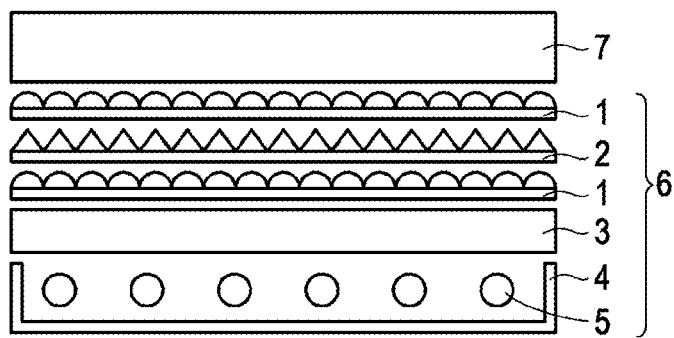
FIG. 5A is a schematic view illustrating a first configuration example of a liquid crystal display device according to another embodiment.

FIG. 5A is a schematic view illustrating a first configuration example of a liquid crystal display device according to another embodiment. As illustrated in FIG. 5A, the liquid crystal display device is provided with a backlight 6 that emits light and a liquid crystal panel 7 that temporally and spatially modulates light emitted from the backlight 6 to display an image.

A description is given below in order to the backlight 6 and the liquid crystal panel 7 configuring the liquid crystal display device.

Backlight

As the backlight 6, a direct type backlight, an edge type backlight, or a flat light source type backlight can be used, for example. In FIG. 5A, a case is exemplified that the backlight 6 is a direct type backlight. The backlight 6 is provided with, for example, a reflection sheet 4, light sources 5, a diffuser panel 3, two diffusion sheets 1, and a lens sheet 2. The reflection sheet 4 is disposed on a back face of the liquid crystal display device, which is the other side of the display face. Between the light sources 5 and the liquid crystal panel 7, the diffuser panel 3, the diffusion sheet 1, the lens sheet 2, and the diffusion sheet 1 are disposed in this order from the light sources 5 towards the liquid crystal panel 7.

As the light sources 5, for example, cold cathode fluorescent lamps (CCFL), hot cathode fluorescent lamps (HCFL), organic electroluminescence (OEL), inorganic electroluminescence (IEL), light emitting diodes (LED), and the like are used.

The reflection sheet 4 is used to enhance the efficiency of light utilization by, for example, diffusing or reflecting the light emitted from the light sources 5. As the reflection sheet 4, for example, a diffuse reflective (white) reflection sheet, a specular reflective reflection sheet, and the like can be used. As the diffuse reflective reflection sheet 4, for example, a white polyester film, an interface multireflection sheet (for example, a superwhite polyester film and the like) can be used. As the specular reflective reflection sheet 4, for example, a metal thin film, such as a silver (Ag) thin film, can be used.

The lens sheet 2 is used to collect the diffusion light from the light sources 5 and improve the luminance. As the lens sheet 2, for example, a prism sheet with sharp prism apexes, a prism sheet with round prism apexes, a prism sheet with a random prism pattern formed on the one principal surface, an optical sheet (wave sheet) with an even wave pattern formed on the one principal surface, and the like can be used.

Since the diffusion sheets 1 are similar to that described above in the previous embodiment, the description is omitted.

Liquid Crystal Panel

As the liquid crystal panel 7, it is possible to use those of a display mode, such as a twisted nematic (TN) mode, a super twisted nematic (STN) mode, a vertically aligned (VA) mode, an in-plane switching (IPS) mode, an optically compensated birefringence (OCB) mode, a ferroelectric liquid crystal (FLC) mode, a polymer dispersed liquid crystal (PDLC) mode, a phase change guest host (PCGH) mode, and the like, for example.

In addition, the backlight 6 is preferably provided further with a reflective polarizer, not shown. This is because it enables to effectively utilize the light emitted from the light sources 5 and allows enhancing the luminance of the liquid crystal display device and reducing the power consumption. The reflective polarizer is preferably disposed adjacent to the liquid crystal panel 7 on the side of the liquid crystal panel 7. The reflective polarizer lets only one of the orthogonal polarization components pass through and reflects the other. As the reflective polarizer, for example, a laminate can be used, such as an organic multilayer film, an inorganic multilayer film, a liquid crystal multilayer film, or the like.

Second Configuration Example

Figure 5B:
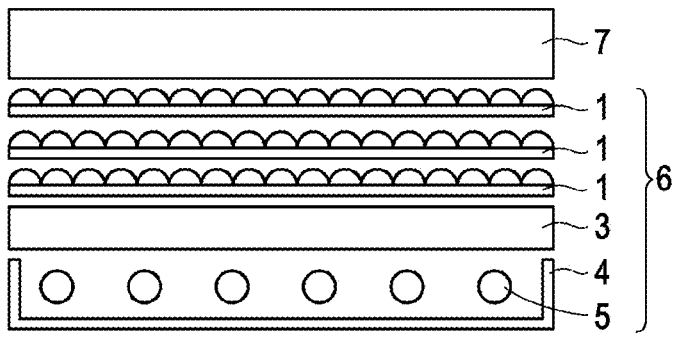
FIG. 5B is a schematic view illustrating a second configuration example of a liquid crystal display device according to this embodiment.

FIG. 5B is a schematic view illustrating a second configuration example of a liquid crystal display device according to this embodiment. As illustrated in FIG. 5B, a backlight 6 is provided with a diffuser panel 3 and three of diffusion sheets 1. The diffuser panel 3 and three of the diffusion sheets 1 are disposed in this order from the light sources 5 towards the liquid crystal panel 7.

In the second configuration example, the elements other than above are similar to the first configuration example.

Third Configuration Example

Figure 5C:
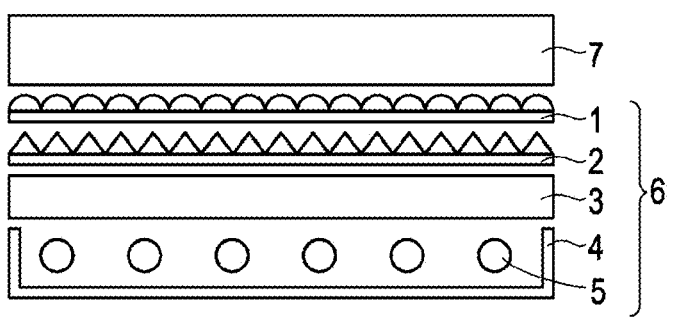
FIG. 5C is a schematic view illustrating a third configuration example of a liquid crystal display device according to this embodiment.

FIG. 5C is a schematic view illustrating a third configuration example of a liquid crystal display device according to this embodiment. As illustrated in FIG. 5C, a backlight 6 is provided with a diffuser panel 3, a lens sheet 2, and a diffusion sheet 1. The diffuser panel 3, the lens sheet 2, and the diffusion sheet 1 are disposed in this order from the light sources 5 towards the liquid crystal panel 7.

In the third configuration example, the elements other than above are similar to the first configuration example.

According to this embodiment, since the backlight 6 is provided with the diffusion sheet 1 according to the previous embodiment, the luminance of the liquid crystal display device can be improved. In addition, the lens sheet 2 can also be replaced with the diffusion sheet 1.

EXAMPLES

Although a specific description is given below to embodiments of the present invention by way of Examples, the embodiments of the present invention are not limited only to these Examples.

In the Examples, the average diameter of the structures, the variation of heights, the aspect ratio, the average side face angle, the average length of the base portions, and the filling factor are obtained in the following manner.

Average Diameter of Structures

Firstly, a surface of the diffusion sheet with the structures formed thereon was photographed from above using a scanning electron microscope (SEM) at 125-fold (for example, FIG. 7A) and 1000-fold (for example, FIG. 7B), respectively. Next, ten structures (convex portions) are selected at random out of the photographed SEM photographs and the respective diameters were measured. Next, the average diameter $D(=(D_1+D_2+ \ldots +D_{10})/10)$ of the structures was obtained by simply averaging (arithmetic average) the measured values.

Variation of Heights

Figure 6:
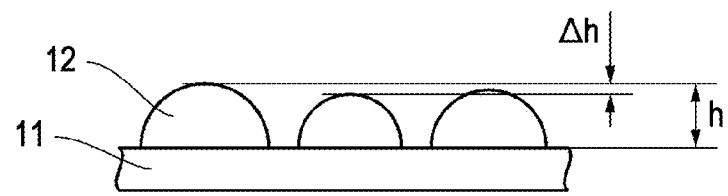
FIG. 6 is a schematic view illustrating a variation of heights in structures.

FIG. 6 is a schematic view illustrating a variation of heights in structures. Firstly, the diffusion sheet with the structures 12 formed therein is cut out perpendicularly to the principal surface thereof and the section was photographed with an SEM at 1000-fold (for example, FIG. 7C). Next, ten structures (convex portions) 12 in which the apexes were photographed were selected at random out of the photographed SEM photographs and the respective heights of the structures 12 were measured. The height of each structure 12 was defined as a perpendicular distance from the bottom face of the structure to the apex of the structure. Here, the bottom face of the structure denotes a section when cutting the structure 12 on a plane including the flat portion between the structures. Next, the average height $h(=(h_1+h_2+ \ldots +h_{10})/10)$ of the structures 12 was obtained by simply averaging (arithmetic average) the measured values. Next, Δh, which is an average value of the differences between the average height h and the respective heights of the ten structures 12 described above, was obtained by the following expression.

$$\Delta h = (|h-h_1|+|h-h_2|+ \ldots +|h-h_{10}|)/10$$

Next, the variation of the ten structures 12 described above was obtained by the following expression using the average height h and the average value Δh of the differences obtained in the manner described above.

$$K=(\Delta h/h) \times 100 [\%]$$

Aspect Ratio

Firstly, the average diameter D of the structures was obtained in the manner described above in the method of calculating "Average Diameter of Structures", and a half value of the average diameter D is established as the average radius r (=D/2) of the structures. Next, the average height h of structures was obtained in the manner described above in the method of calculating "Variation of Heights". Next, the aspect ratio h/r of the structures 12 was obtained using the average radius r and the average height h obtained in the manner described above.

Average Side Face Angle

Figure 7A:
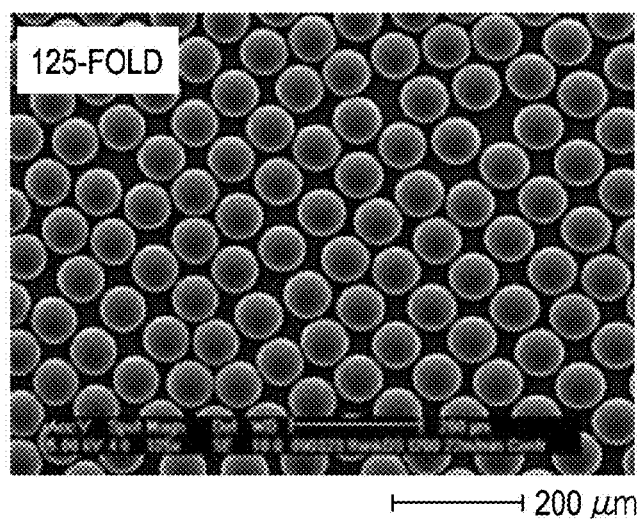
FIGS. 7A through 7C are SEM photographs of a diffusion sheet of Example 1.
Figure 7B:
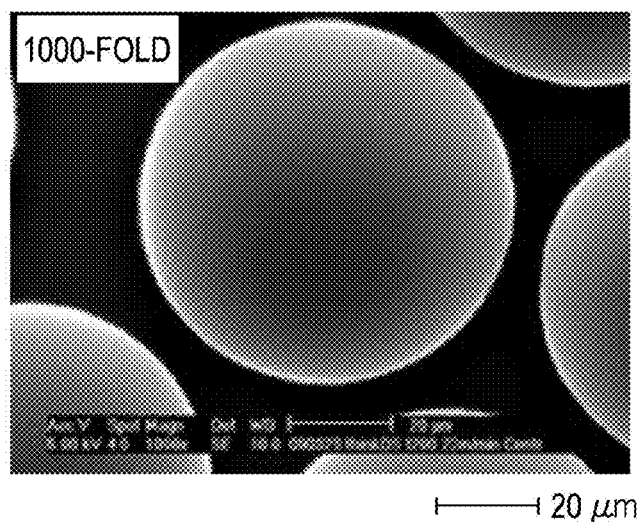
Figure 7C:
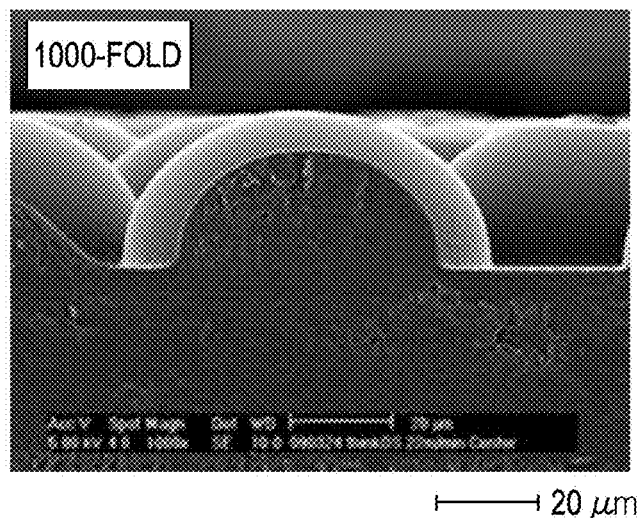

Firstly, the diffusion sheet with the structures formed therein was cut out perpendicularly to the principal surface thereof and the section was photographed with an SEM at 1000-fold (for example, FIG. 7C). Next, ten structures (convex portions) in which the outlines of the structures can be confirmed from within the plane of diffusion sheet were selected at random out of the photographed SEM photographs. Near the intersection between the outline of each structure and the outline of each flat portion between the structures, the angle between the tangents of both was measured and was established as a side face angle of each structure. Next, the average side face angle $\theta(=(\theta_1+\theta_2+\ldots+\theta_{10})/10)$ of the structures was obtained by simply averaging (arithmetic average) the measured values.

Average Length of Base Portions

Firstly, the diffusion sheet with the structures formed therein was cut out perpendicularly to the principal surface thereof and the section was photographed with an SEM at 1000-fold (for example, FIG. 7C). Next, ten structures (convex portions) in which the outlines can be confirmed from within the plane of diffusion sheet were selected at random out of the photographed SEM photographs, and the respective heights of the structures were measured that have the side face angle $\theta$ in a range of not less than 85 degrees and not more than 90 degrees to define them as the length of the base portion of each structure. It should be noted that the side face angle $\theta$ is an angle between the tangents of the outline of each structure and the outline of each flat portion between such structures in a case of viewing the respective structure and the flat portion between such structures from within the plane of diffusion sheet. Next, the average length $l(=(l_1+l_2+\ldots+l_{10})/10)$ of the base portions of the structures was obtained by simply averaging (arithmetic average) the measured values.

Filling Factor

The ratio (%) of an area occupied by the structures per unit area in an SEM photograph (for example, FIG. 7A) is defined as a filling factor.

Example 1

Firstly, a cylindrical matrix fabrication substrate was prepared that was formed of a metal excellent in thermal conductivity. Next, a resist layer was formed on an outer circumferential face of the cylindrical matrix fabrication substrate. Next, a circular random pattern with a diameter of 70 μm was generated by a computer. Next, after exposing the resist layer formed on the outer circumferential face of the matrix fabrication substrate based on the generated pattern with a laser light, the exposed resist layer was developed. This enabled to form apertures corresponding to the generated pattern mentioned above in the resist layer. Next, using the resist layer with the apertures formed therein as a mask, the outer circumferential face of the matrix fabrication substrate was wet etched. This enabled to obtain a roll matrix with structures in a partially spherical shape randomly formed on the outer circumferential face. Next, after loading the roll matrix into the molding apparatus, a polycarbonate sheet (PC sheet) was molded by melt extrusion and also the concavity and convexity in the roll matrix were pattern transferred to a surface of the PC sheet. This enabled to obtain a diffusion sheet in a strip form with the structures in a partially spherical shape.

Example 2

Firstly, a cylindrical matrix fabrication substrate was prepared that was formed of a metal excellent in thermal conductivity. Next, similar to Example 1 other than generating a circular random pattern with a diameter of 50 μm by a computer, an annular matrix was obtained. Next, after loading the annular matrix into a molding apparatus as an embossing belt, the concavity and convexity of the embossing belt were pattern transferred to the surface of the PC sheet by lamination transfer molding. This enabled to obtain a diffusion sheet in a strip form with the structures in a partially spherical shape.

Example 3

Similar to Example 1 other than modifying the aspect ratio, a diffusion sheet was obtained.

Examples 4 and 5

Similar to Example 2 other than modifying the spherical diameter, the aspect ratio, and the filling factor, respective diffusion sheets were obtained.

Comparative Example 1

Firstly, after applying an adhesive on a plate substrate, spherical beads were spread to fabricate a matrix. Next, a replica matrix of this matrix was fabricated in the following manner. After forming a metal plated layer by electroforming on the concave and convex plane of the matrix, the metal plated layer was removed from the matrix. This enabled to obtain a replica matrix with an inverted pattern of the concave and convex plane of the matrix.

Next, an ultraviolet curable resin was applied on one principal surface of a PC sheet, and then the replica matrix was pressed against the applied ultraviolet curable resin and also ultraviolet rays were irradiated to the ultraviolet curable resin from the side of the PC sheet to cure the ultraviolet curable resin. This enabled to obtain a diffusion sheet with structures in a partially spherical shape.

Comparative Example 2

Firstly, a resin composition was prepared by dispersing spherical beads in an ultraviolet curable resin. Next, the resin composition was applied on one principal surface of a PC sheet, and then ultraviolet rays were irradiated to cure the resin composition. This enabled to obtain a diffusion sheet with structures in a partially spherical shape.

Comparative Examples 3 through 6

Similar to Example 2 other than changing the average diameter of the bottom faces, the aspect ratio, and the filling factor, a diffusion sheet was obtained.

Evaluation of Structure Shape

Figure 8A:
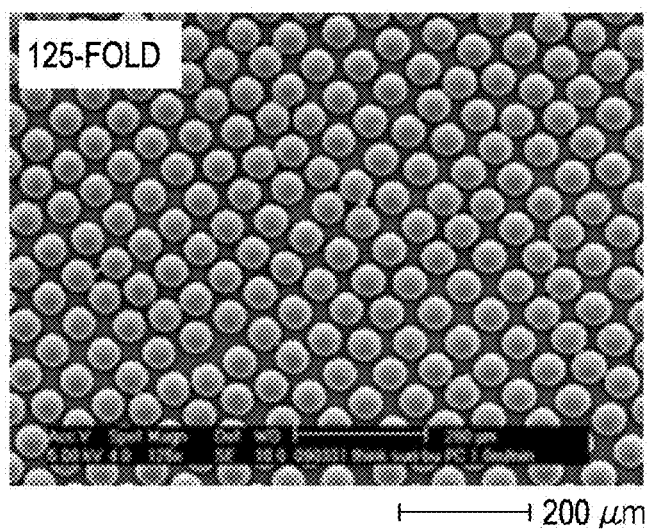
FIGS. 8A through 8C are SEM photographs of a diffusion sheet of Example 2.
Figure 8B:
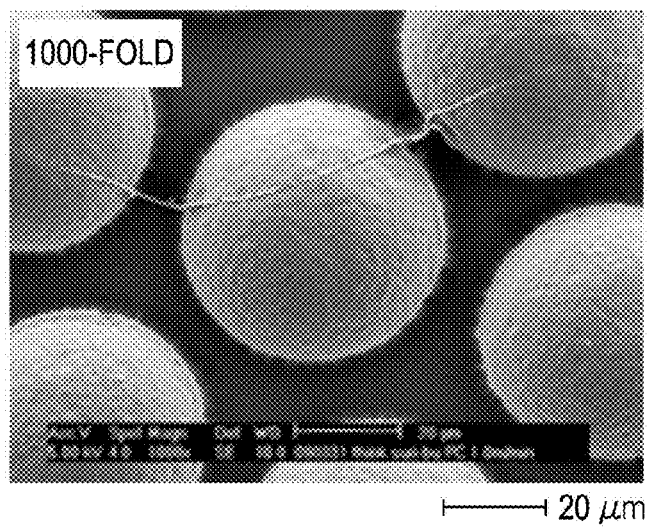
Figure 8C:
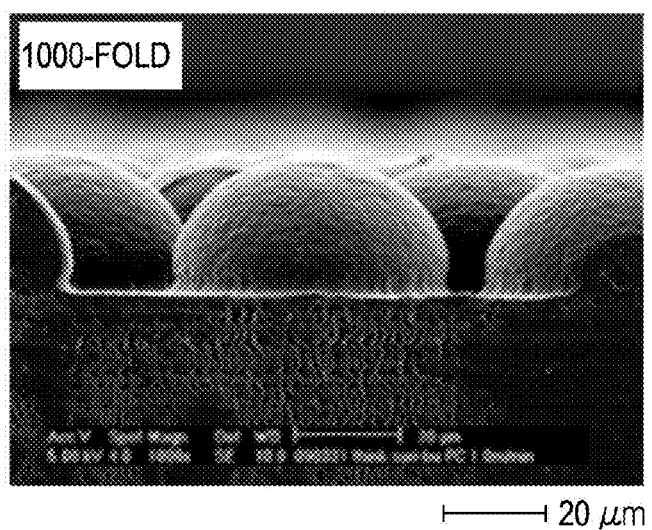
Figure 9A:
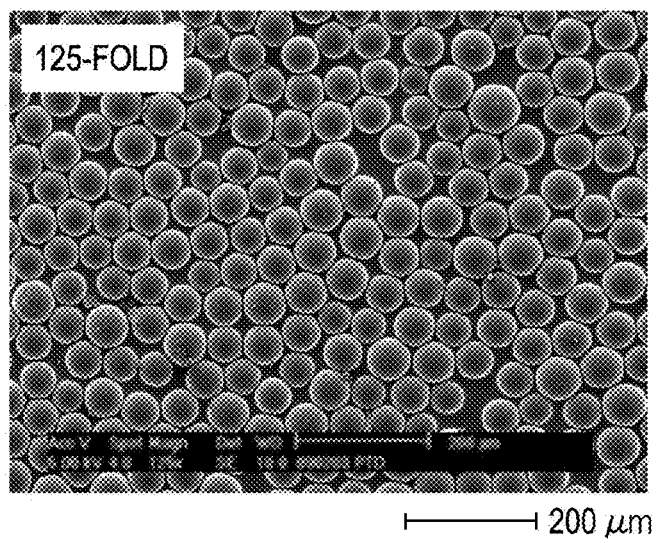
FIGS. 9A through 9C are SEM photographs of a diffusion sheet of Comparative Example 1.
Figure 9B:
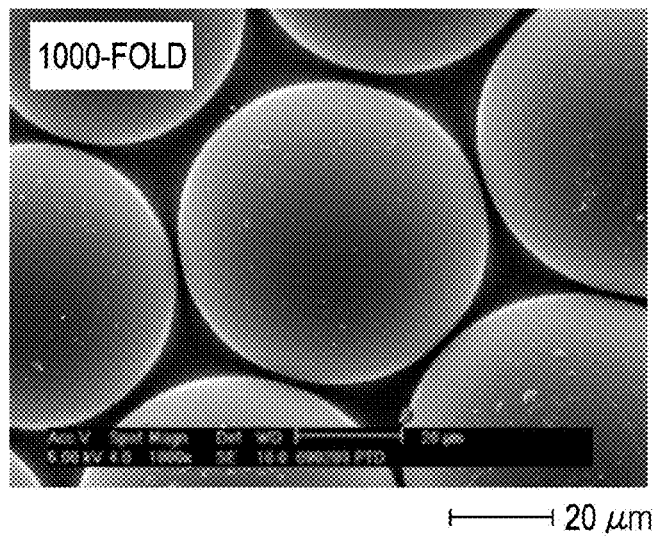
Figure 9C:
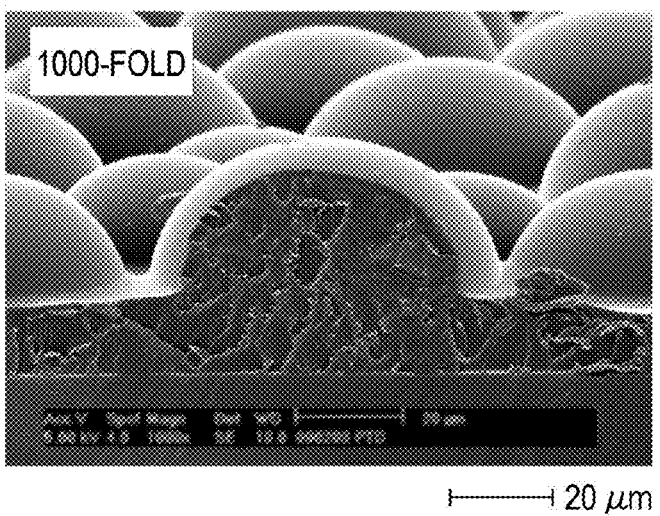
Figure 10A:
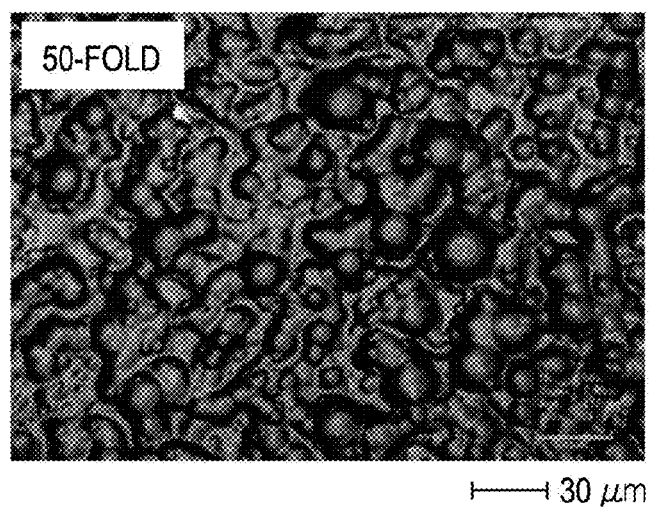
FIGS. 10A and 10B are SEM photographs of a diffusion sheet of Comparative Example 2.
Figure 10B:
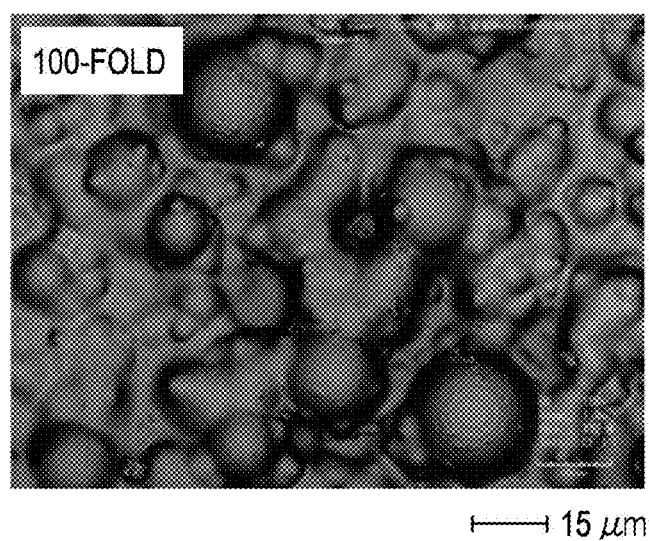

The concave and convex planes of the diffusion sheets of Examples 1 through 5 and Comparative Examples 1 through 6 obtained in the manner described above were photographed with an SEM. Then, based on the photographed SEM photographs, the structure shapes, the average diameters of the structures, the variations of the heights, the aspect ratios, the filling factors, and the like were evaluated. The results are shown in Table 1. FIGS. 7A through 7C illustrate SEM photographs of the diffusion sheet of Example 1. FIGS. 8A through 8C illustrate SEM photographs of the diffusion sheet of Example 2. FIGS. 9A through 9C illustrate SEM photographs of the diffusion sheet of Comparative Example 1. FIGS. 10A and 10B illustrate SEM photographs of the diffusion sheet of Comparative Example 2.

Luminance Factor

Figure 11A:
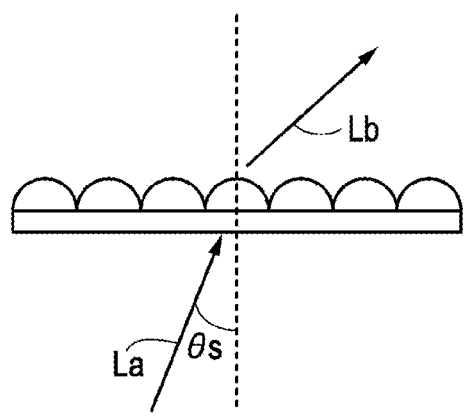
FIG. 11A is a schematic view illustrating a method of measuring a luminance factor.

FIG. 11A is a schematic view illustrating a method of measuring a luminance factor. The luminance factors of the diffusion sheets were measured by introducing light La from a reverse face (a face on the other side of the concave and convex plane) of the diffusion sheets of Examples 1 and 2 and Comparative Examples 1 and 2 obtained in the manner described above. The measurements of luminance factor were carried out by modifying the incident angles θs of light from 0 to 80 degrees for every 10 degrees by reference to a perpendicular of the reverse face of the diffusion sheet. As the measuring device, a gonio-spectrophotometric color measurement system manufactured by Murakami Color Research Laboratory Co., Ltd., product name: GCMS-4) was used. The results are illustrated in FIGS. 12A through 13B.

Luminance and Viewing Angle Characteristics

Figure 11B:
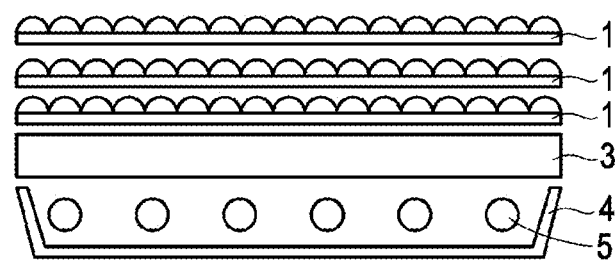
FIG. 11B is a schematic view illustrating a method of measuring luminance and a viewing angle.
Figure 14:
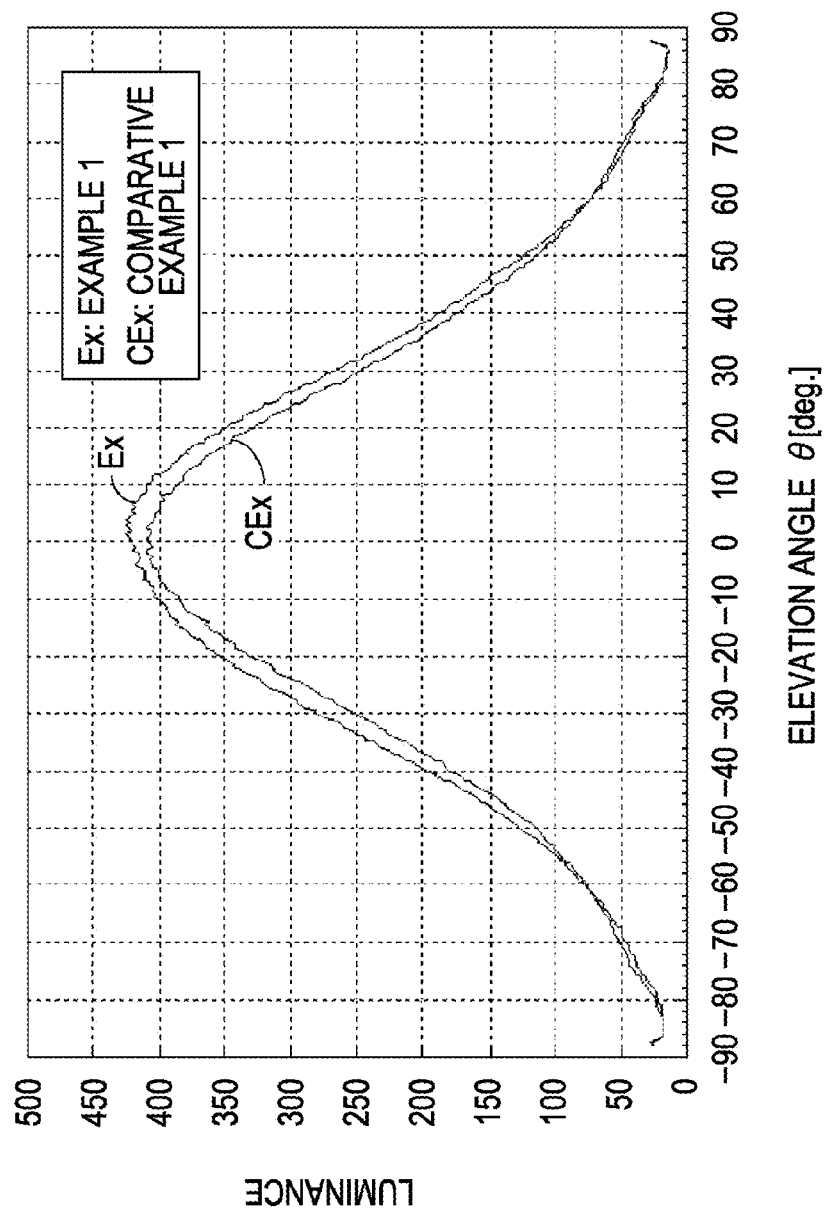
FIG. 14 is a graph illustrating luminance and viewing angle characteristics of the diffusion sheets of Example 1 and Comparative Example 1.

FIG. 11B is a schematic view illustrating a method of measuring luminance and a viewing angle. The characteristics of the luminance and the viewing angle of the diffusion sheets of Example 1 and Comparative Example 1 obtained in the manner described above were evaluated in the following manner. Three of the diffusion sheets 1 to be evaluated were overlapped above a backlight unit composed of the light sources 5, the reflective film 4, and the diffuser panel 3 (refer to FIG. 11B), and the luminance and viewing angle characteristics were evaluated by measuring the center portion with a luminance meter (manufactured by ELDIM, product name: EZContrast XL88). The results are illustrated in FIG. 14.

Characteristics of Haze and Transmittance

Figure 15:
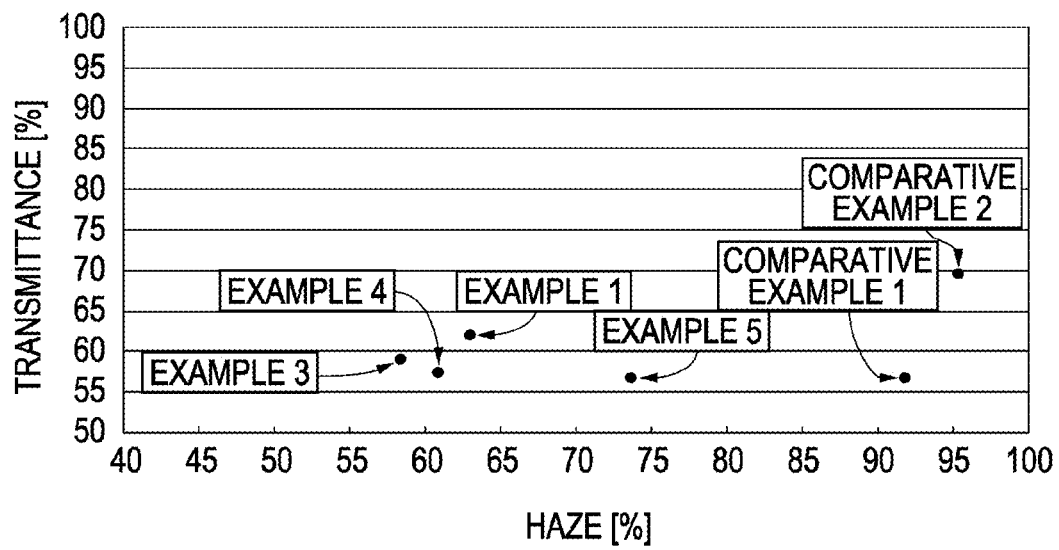
FIG. 15 is a graph illustrating luminance characteristics of diffusion sheets of Examples 1 and 3 through 5 and Comparative Examples 1 and 2.

The haze and transmittance of the diffusion sheets of Examples 1 and 3 through 5 and Comparative Examples 1 and 2 obtained in the manner described above were measured using a haze and transmittance meter (manufactured by Murakami Color Research Laboratory Co., Ltd., product name: HM-150). The results of measuring the haze and transmittance of Examples 1 and 3 through 5 and Comparative Examples 1 and 2 are illustrated in FIG. 15.

Relative Luminance

Figure 16:
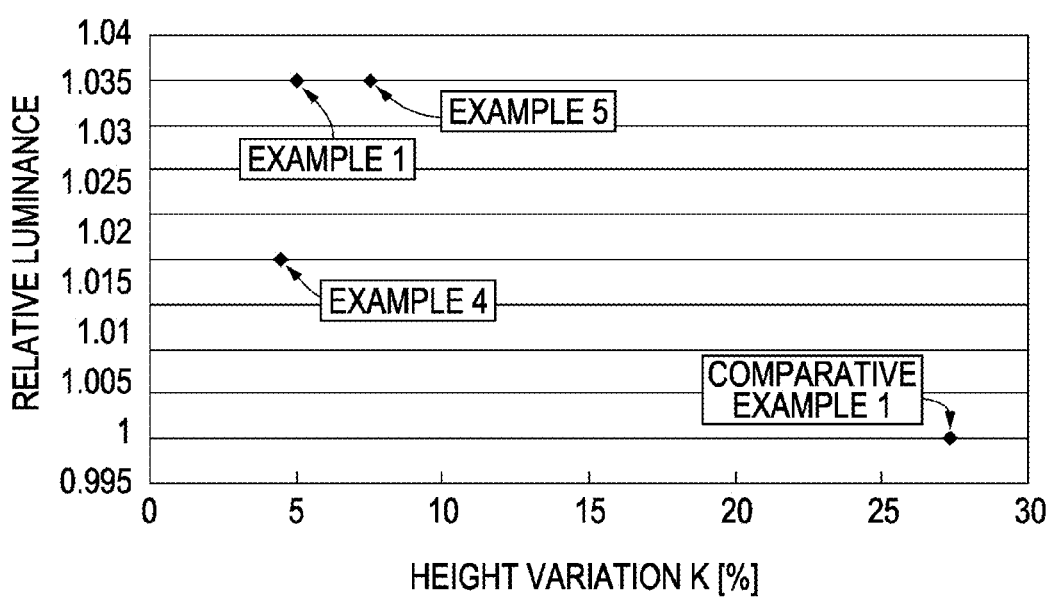
FIG. 16 is a graph illustrating luminance characteristics of the diffusion sheets of Examples 1, 4, and 5 and Comparative Example 1.

Each one of the diffusion sheets of Examples 1, 4, and 5 and Comparative Example 1 obtained in the manner described above was placed on a respective backlight unit composed of light sources, a reflective film, and a light guide, not shown, and the luminance was measured with a luminance meter (manufactured by Topcon Corporation, product name: BM-7). The results of measurement are illustrated in FIG. 16. The luminance of Examples 1, 4, and 5 are shown in relative luminance by reference to the luminance of Comparative Example 1.

Relative Luminance

Figure 17A:
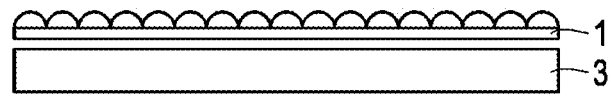
FIG. 17A is a schematic view illustrating a method of measuring luminance.

FIG. 17A is a schematic view illustrating a method of measuring luminance. The luminance when the diffusion sheets 1 of Examples 1 and 5 and Comparative Examples 1 and 3 through 6 obtained in the manner described above were disposed on the respective diffuser panel 3 was evaluated in the following manner. Each one of the diffusion sheets 1 of Examples 1 and 5 and Comparative Examples 1 and 3 through 6 obtained in the manner described above were placed on a respective backlight unit composed of the light sources, the reflective film, and a light guide, not shown, and the luminance was measured with a luminance meter (manufactured by Topcon Corporation, product name: BM-7). The results of measurement are illustrated in FIG. 17C. The luminance of Examples 1 and 5 and Comparative Examples 3 through 6 are shown in relative luminance by reference to the luminance of Comparative Example 1.

(Moire)

Figure 17B:
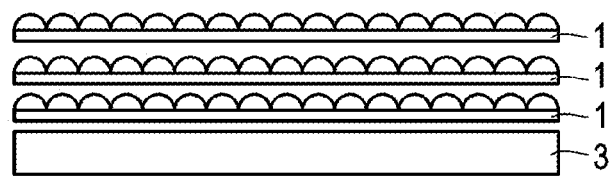
FIG. 17B is a schematic view illustrating a method of evaluating generation of moire.
Figure 17C:
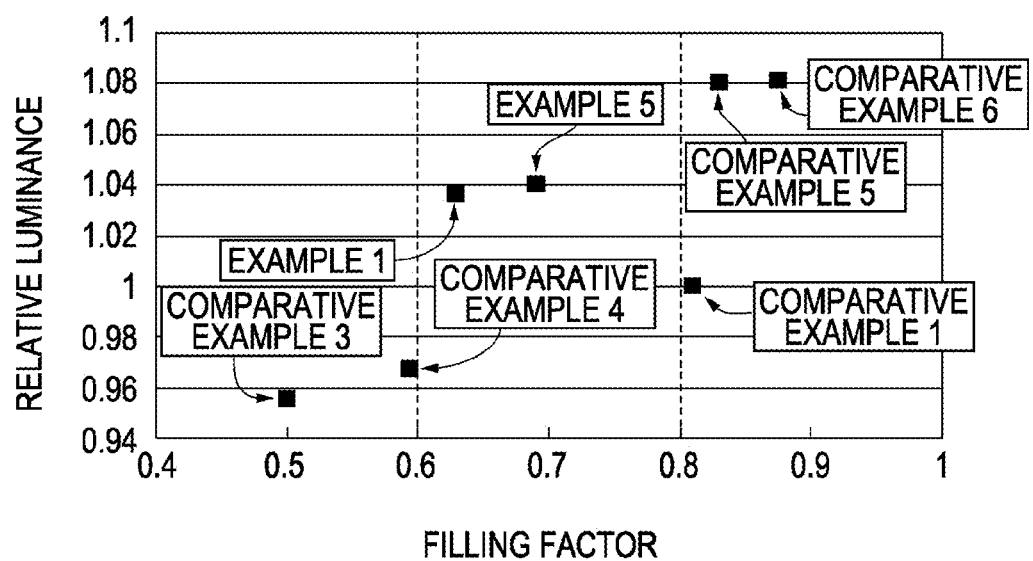
FIG. 17C is a graph illustrating relative luminance characteristics of diffusion sheets of Examples 1 and 5 and Comparative Examples 1 and 3 through 6.

FIG. 17B is a schematic view illustrating a method of evaluating generation of moire. The presence of moire generation when three of the diffusion sheets 1 of Examples 1 and 5 and Comparative Examples 3 through 6 obtained in the manner described above were disposed on the respective diffuser panel 3 was evaluated in the following manner. Three of the diffusion sheets 1 of Examples 1 and 5 and Comparative Examples 3 through 6 obtained in the manner described above were placed on a respective backlight unit composed of the light sources, the reflective film, and a light guide, not shown, to visually evaluate while the light sources are lighted. The results are shown in Table 2.

From FIG. 17C, the followings are found. In a case of the filling factor less than 60%, the luminance is insufficient. On the other hand, in a case of the filling factor more than 80%, the alignment of the structures naturally becomes closer to a regular alignment and moire turns out to be generated. Accordingly, it is desired, as the embodiments of the present invention, to control the filling factor to be not less than 60% and not more than 80%, preferably not more than 75%, more preferably not more than 70%. By establishing the filling factor in such a range, it becomes possible to secure sufficient luminance while suppressing the generation of moire.

Tables 1 and 2 show the configurations of the diffusion sheets of Examples 1 through 5 and Comparative Examples 1 through 6 and the results of evaluation.

TABLE 1

| | Overall structure | Method of matrix fabrication | Method of concave and convex plane formation | Alignment | Structure shape |
|---|---|---|---|---|---|
| Example 1 | Single layer structure | Etching | Melt extrusion molding | Random | Partially spherical shape |
| Example 2 | Single layer structure | Etching | Lamination transfer | Random | Partially spherical shape |
| Example 3 | Single layer structure | Etching | Melt extrusion molding | Random | Partially spherical shape |
| Example 4 | Single layer structure | Etching | Lamination transfer | Random | Partially spherical shape |
| Example 5 | Single layer structure | Etching | Lamination transfer | Random | Partially spherical shape |
| Comparative Example 1 | Three layer structure | Electro-forming inversion | Ultraviolet curing | Random | Partially spherical shape |
| Comparative Example 2 | Three layer structure | — | Beads application | Random | Partially spherical shape |
| Comparative Example 3 | Single layer structure | Etching | Lamination transfer | Random | Partially spherical shape |
| Comparative Example 4 | Single layer structure | Etching | Lamination transfer | Random | Partially spherical shape |
| Comparative Example 5 | Single layer structure | Etching | Lamination transfer | Random | Partially spherical shape |

TABLE 1-continued

|  | Overall structure | Method of matrix fabrication | Method of concave and convex plane formation | Alignment | Structure shape |
|---|---|---|---|---|---|
| Comparative Example 6 | Single layer structure | Etching | Lamination transfer | Random | Partially spherical shape |

TABLE 2

|  | Bottom face average diameter [μm] | Height variation [%] | Aspect ratio | Filling factor [%] | Haze [%] | Transmittance [%] | Luminance ratio | Horizontal viewing angle [°] | Relative luminance | Presence of moire |
|---|---|---|---|---|---|---|---|---|---|---|
| Example 1 | 72 | 5 | 0.94 | 63 | 63 | 62 | 1.04 | 79 | — | None |
| Example 2 | 49 | — | 1.06 | 51 | — | — | — | — | — | — |
| Example 3 | 72 | 4.5 | 0.88 | 63 | 58.4 | 58.9 | — | — | — | — |
| Example 4 | 52.6 | 4.5 | 0.94 | 57 | 60.9 | 57.3 | — | — | — | — |
| Example 5 | 32.5 | 7.5 | 0.88 | 69 | 73.7 | 56.6 | — | — | — | None |
| Comparative Example 1 | 59 | 27.3 | 0.74 | 81 | 91.9 | 56.6 | 1 | 79 | — | — |
| Comparative Example 2 | — | — | — | — | 95.4 | 69.5 | — | — | — | — |
| Comparative Example 3 | 67 | — | 0.94 | 50 | — | — | — | — | 0.95 | None |
| Comparative Example 4 | 68.9 | — | 0.94 | 59.3 | — | — | — | — | 0.97 | None |
| Comparative Example 5 | 69.7 | — | 0.92 | 83 | — | — | — | — | 1.08 | Found |
| Comparative Example 6 | 69.7 | — | 0.9 | 87 | — | — | — | — | 1.08 | Found |

From the evaluation results described above, the followings are found.

In Examples 1 and 2, since the matrixes were fabricated by lithography and etching, the variations K of the heights in the structures can be not more than 10%. In contrast, in Comparative Example 1, since the matrix was fabricated by replicated electroforming of the spread beads, the variation K of the heights in the structures turns out to be more than 10%. In Comparative Example 2, since the diffusion sheet was fabricated by applying beads, the variation K of the heights in the structures turns out to be more than 10%.

Figure 12A:
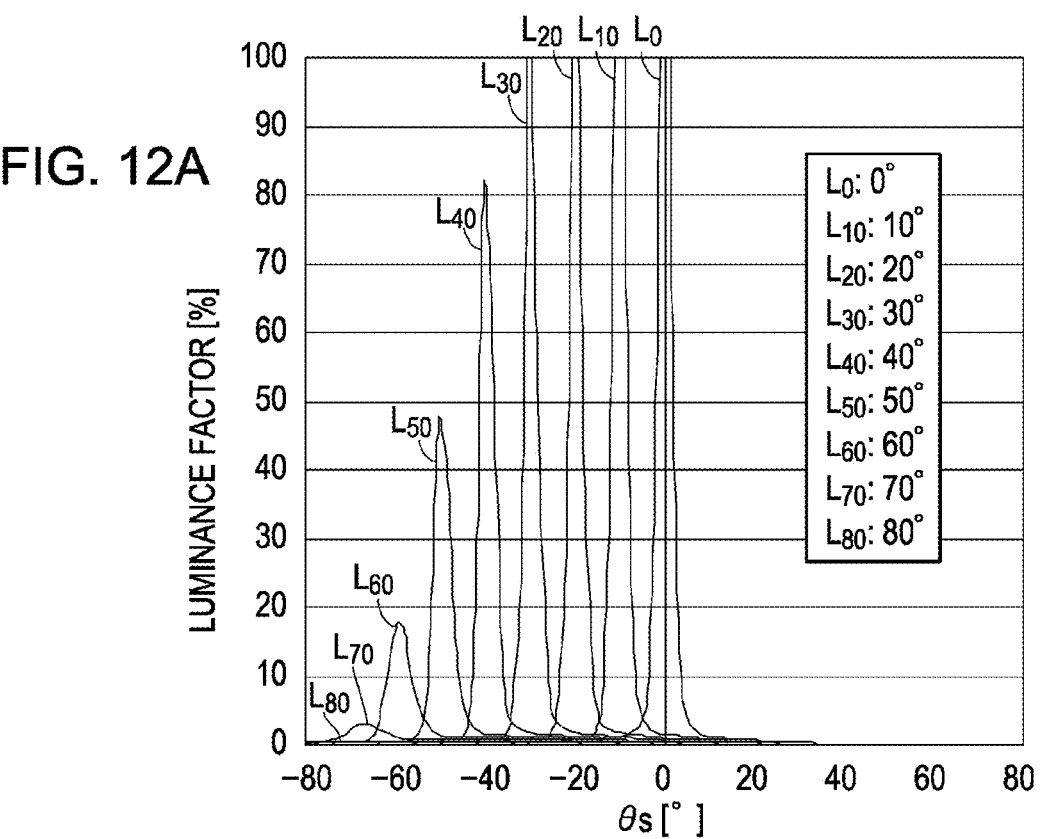
FIG. 12A is a graph illustrating luminance characteristics of the diffusion sheet of Example 1.
Figure 12B:
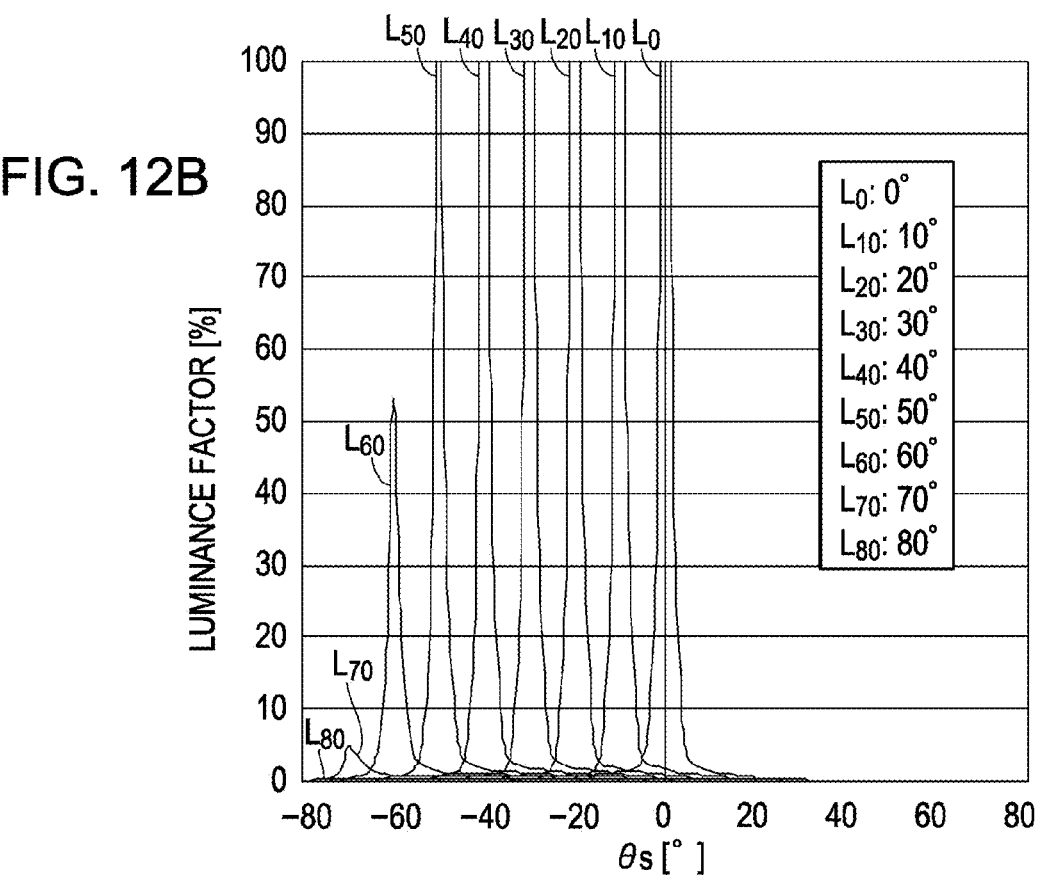
FIG. 12B is a graph illustrating luminance characteristics of the diffusion sheet of Example 2.
Figure 13A:
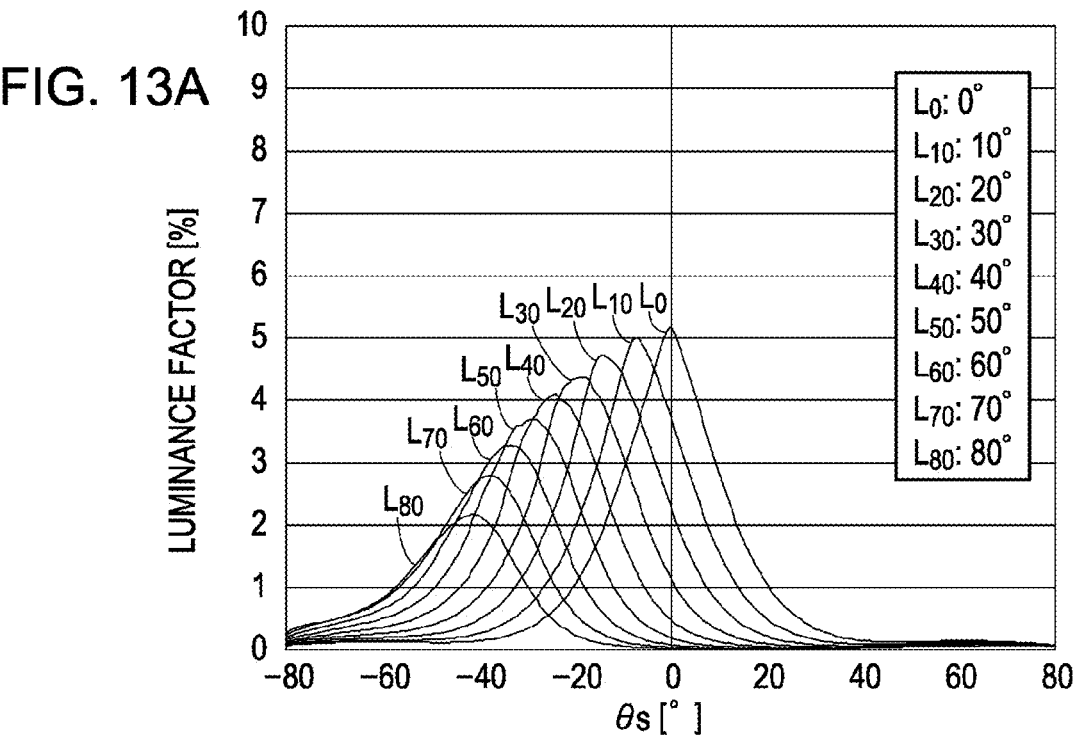
FIG. 13A is a graph illustrating luminance characteristics of the diffusion sheet of Comparative Example 2.
Figure 13B:
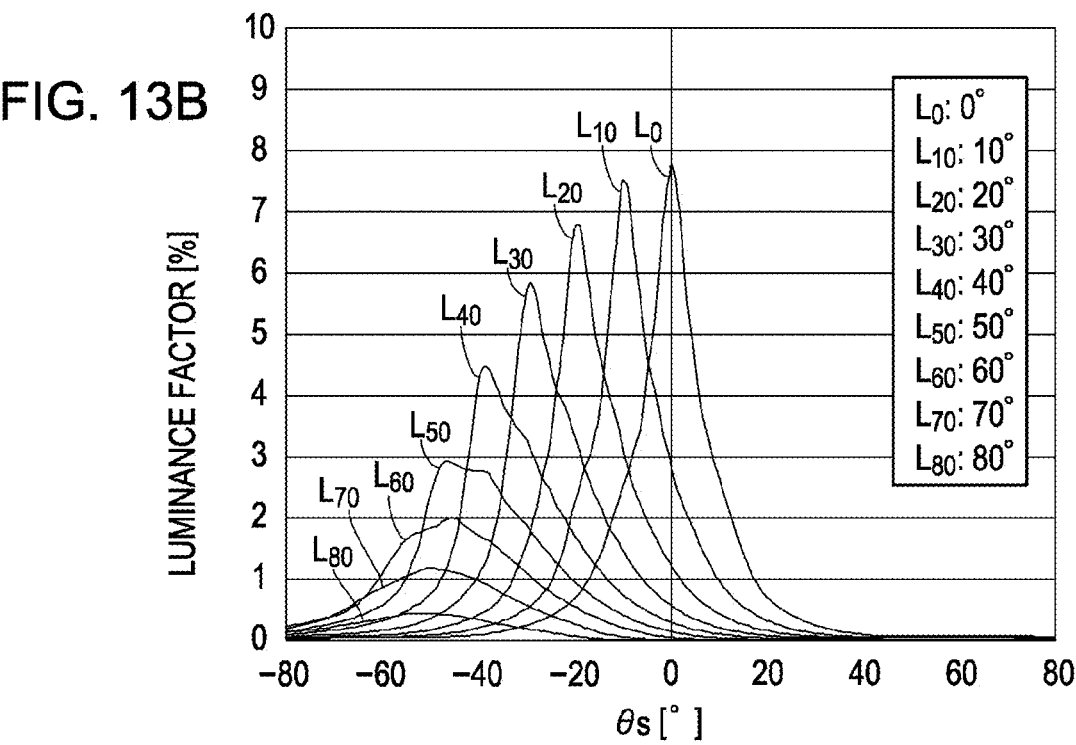
FIG. 13B is a graph illustrating luminance characteristics of the diffusion sheet of Comparative Example 1.

In Examples 1 and 2 in which the variations K are not more than 10%, the higher luminance factors were obtained in wider ranges of angles from 0 to 80 degrees than in Comparative Examples 1 and 2 in which the variations K were more than 10% (FIGS. 12A and 12B). Regarding the luminance, in Example 1, the higher luminance was obtained in a wider range of angles than in Comparative Example 1 (FIG. 14).

Test Examples 1 through 5

Figure 18:
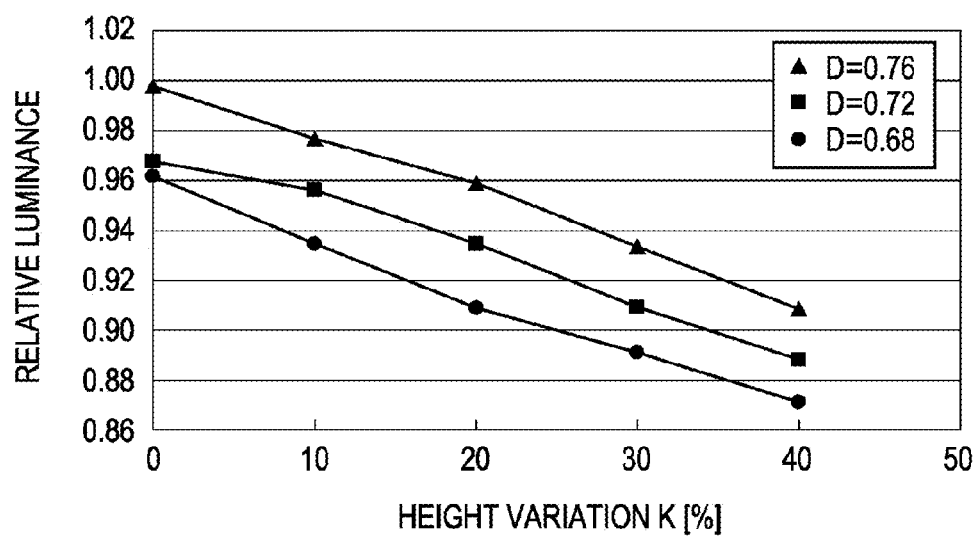
FIG. 18 is a graph illustrating luminance characteristics of diffusion sheets of Test Examples 1 through 15.

Relative luminance of diffusion sheets with structures of the configurations described below formed on respective one principal surface was obtained by simulation. Specifically, the filling factor was established as D=0.68 and the relative luminance (luminance in a case that the luminance in Comparative Example 1 is 1) was obtained by simulation with the variations K of heights changed in a range from 0% to 20%. The results are illustrated in FIG. 18.
  Configuration of Structures
  Overall structure: Single layer structure, PC sheet
  Alignment: Honeycomb regular alignment
  Structure shape: Partially spherical shape
  Height variation: 0% to 20%

Test Examples 6 through 10

Similar to Test Examples 1 through 5 other than establishing the filling factor as D=0.72, the relative luminance was obtained. The results are illustrated in FIG. 18.

Test Examples 11 through 15

Similar to Test Examples 1 through 5 other than establishing the filling factor as D=0.76, the relative luminance was obtained. The results are illustrated in FIG. 18.

From FIG. 18, the followings are found.

In a case of the prescribed filling factor of not less than 60% and less than 80%, the relative luminance decreased more as the variation K of heights became larger. Since it is found that the luminance is prone to linearly decrease relative to the variation K, the decrease of the luminance in the variation K of not less than 10% is supposed to damage the characteristics of a backlight.

Test Examples 16 through 26

Figure 19:
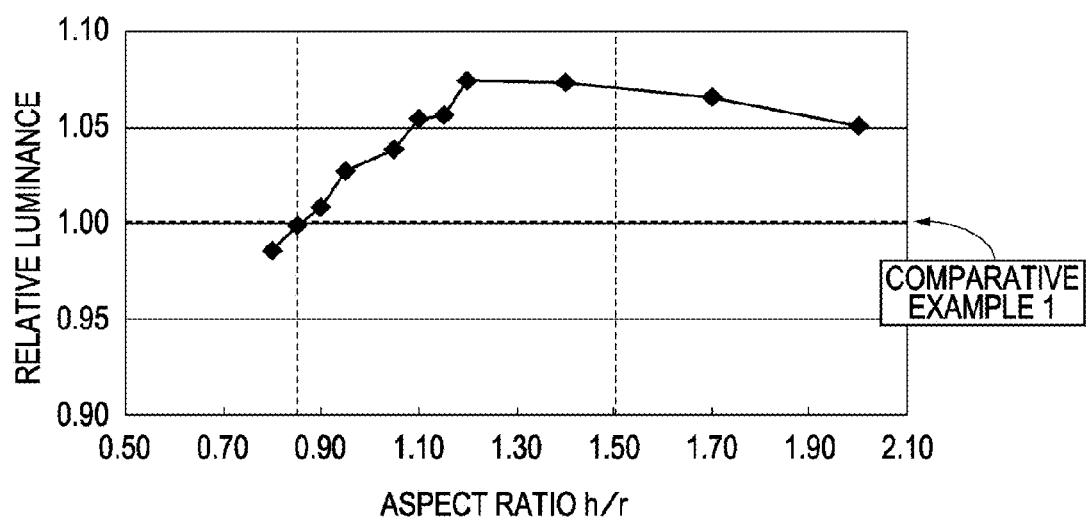
FIG. 19 is a graph illustrating luminance characteristics of diffusion sheets of Test Examples 16 through 26.

The relative luminance of diffusion sheets with structures of the configuration described below formed on respective one principal surface was obtained by simulation. The results are illustrated in FIG. 19.
  Configuration of Structures
  Overall structure: Single layer structure, PC sheet
  Alignment: Honeycomb regular alignment
  Structure shape: Partially spherical shape
  Height variation: 0%
  Aspect ratio h/r: 0.80, 0.85, 0.90, 0.95, 1.05, 1.10, 1.15, 1.20, 1.40, 1.70, 2.00
  Filling factor: 68%

From FIG. 19, it is understood that the luminance equivalent to or more than that of the diffusion sheet in Comparative Example 1 was able to be obtained by the aspect ratio h/r of the structures being more than 0.85.

According to the findings obtained by the present inventors from the experiments, by establishing the aspect ratio h/r of the structures as not more than 1.50, the transferability of the structures can be improved.

From above, the aspect ratio h/r of the structures is preferably more than 0.85 and not more than 1.50.

Test Examples 27 through 36

Figure 20:
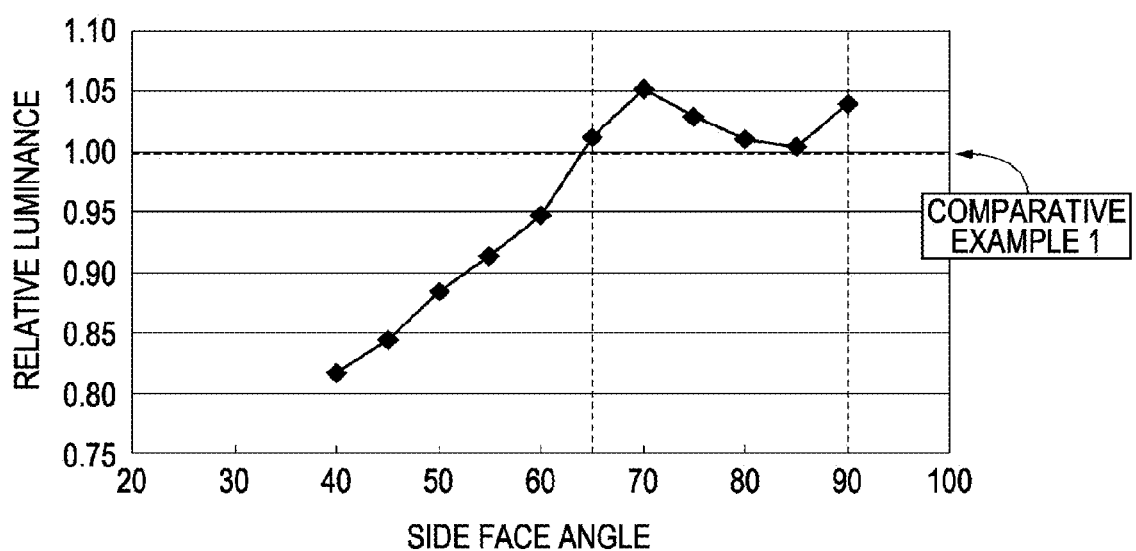
FIG. 20 is a graph illustrating luminance characteristics of diffusion sheets of Test Examples 27 through 36.

The relative luminance of diffusion sheets with structures of the configuration described below formed on respective one principal surface was obtained by simulation. The results are illustrated in FIG. 20.
Configuration of Structures
Overall structure: Single layer structure, PC sheet
Alignment: Honeycomb regular alignment
Structure shape: Partially spherical shape
Height variation: 0%
Aspect ratio h/r: 1
Average side face angle: Changed for every 5 degrees in a range from 40 to 85 degrees
Filling factor: 68%

From FIG. 20, it is understood that, by establishing the average side face angle θ of the structures as not less than 65°, the luminance of more than that of the diffusion sheet in Comparative Example 1 was able to be obtained.

According to the findings obtained by the present inventors from the experiments, by establishing the average side face angle θ of the structures as not more than 90°, the demoldability of the structures can be improved.

From above, the average side face angle θ of the structures is preferably not less than 65° and not more than 90°.

Test Examples 37-1 through 37-16

The relative luminance (luminance in a case that the luminance of the diffusion sheet in Comparative Example 1 is 1) of diffusion sheets with structures of the configuration described below formed on respective one principal surface was obtained by simulation. The results are illustrated in Table 3 and FIG. 21A.
Configuration of Structures
Overall structure: Single layer structure, PC sheet
Alignment: Honeycomb regular alignment
Structure shape: Partially spherical shape
Height variation: 0%
Aspect ratio h/r: 0.50 to 2.00
Filling factor: 68%

Test Examples 38-1 through 38-16

The relative luminance (luminance in a case that the luminance is 1 when two of the diffusion sheets in Comparative Example 1 are overlapped) when two of the diffusion sheets with structures of the configuration described below formed on respective one principal surface were overlapped was obtained by simulation. The results are shown in Table 4 and FIG. 21B.
Configuration of Structures
Overall structure: Single layer structure, PC sheet
Alignment: Honeycomb regular alignment
Structure shape: Partially spherical shape
Height variation: 0%
Aspect ratio h/r: 0.50 to 2.00
Filling factor: 68%

Test Examples 39-1 through 39-16

The relative luminance (luminance in a case that the luminance is 1 when three of the diffusion sheets in Comparative Example 1 are overlapped) when three of the diffusion sheets with structures of the configuration described below formed on respective one principal surface were overlapped was obtained by simulation. The results are shown in Table 5 and FIG. 21C.
Configuration of Structures
Overall structure: Single layer structure, PC sheet
Alignment: Honeycomb regular alignment
Structure shape: Partially spherical shape
Height variation: 0%
Aspect ratio h/r: 0.50 to 2.00
Filling factor: 68%

Table 3 shows the aspect ratios h/r and the relative luminance of the diffusion sheets in Test Examples 37-1 through 37-16.

TABLE 3

|  | Diffusion sheets | Aspect ratio (h/r) | Relative luminance |
| --- | --- | --- | --- |
| Test Example 37-1 | 1 | 0.50 | 0.916 |
| Test Example 37-2 |  | 0.55 | 0.931 |
| Test Example 37-3 |  | 0.60 | 0.942 |
| Test Example 37-4 |  | 0.65 | 0.961 |
| Test Example 37-5 |  | 0.70 | 0.971 |
| Test Example 37-6 |  | 0.80 | 0.992 |
| Test Example 37-7 |  | 0.85 | 1.000 |
| Test Example 37-8 |  | 0.90 | 1.011 |
| Test Example 37-9 |  | 0.95 | 1.026 |
| Test Example 37-10 |  | 1.05 | 1.033 |
| Test Example 37-11 |  | 1.10 | 1.052 |
| Test Example 37-12 |  | 1.15 | 1.058 |
| Test Example 37-13 |  | 1.20 | 1.075 |
| Test Example 37-14 |  | 1.40 | 1.071 |
| Test Example 37-15 |  | 1.70 | 1.066 |
| Test Example 37-16 |  | 2.00 | 1.054 |

Table 4 shows the aspect ratio h/r and the relative luminance of the diffusion sheets in Test Examples 38-1 through 38-16.

TABLE 4

|  | Diffusion sheets | Aspect ratio (h/r) | Relative luminance |
| --- | --- | --- | --- |
| Test Example 38-1 | 2 | 0.50 | 0.962 |
| Test Example 38-2 |  | 0.55 | 0.971 |
| Test Example 38-3 |  | 0.60 | 0.979 |
| Test Example 38-4 |  | 0.65 | 0.991 |
| Test Example 38-5 |  | 0.70 | 0.998 |
| Test Example 38-6 |  | 0.80 | 1.008 |
| Test Example 38-7 |  | 0.85 | 1.014 |
| Test Example 38-8 |  | 0.90 | 1.018 |
| Test Example 38-9 |  | 0.95 | 1.027 |
| Test Example 38-10 |  | 1.05 | 1.038 |
| Test Example 38-11 |  | 1.10 | 1.055 |
| Test Example 38-12 |  | 1.15 | 1.062 |
| Test Example 38-13 |  | 1.20 | 1.079 |
| Test Example 38-14 |  | 1.40 | 1.067 |
| Test Example 38-15 |  | 1.70 | 1.055 |
| Test Example 38-16 |  | 2.00 | 1.049 |

Table 5 shows the aspect ratio h/r and the relative luminance of the diffusion sheets in Test Examples 39-1 through 39-16.

TABLE 5

| | Diffusion sheets | Aspect ratio (h/r) | Relative luminance |
|---|---|---|---|
| Test Example 39-1 | 3 | 0.50 | 0.997 |
| Test Example 39-2 | | 0.55 | 1.002 |
| Test Example 39-3 | | 0.60 | 1.004 |
| Test Example 39-4 | | 0.65 | 1.010 |
| Test Example 39-5 | | 0.70 | 1.015 |
| Test Example 39-6 | | 0.80 | 1.019 |
| Test Example 39-7 | | 0.85 | 1.023 |
| Test Example 39-8 | | 0.90 | 1.025 |
| Test Example 39-9 | | 0.95 | 1.029 |
| Test Example 39-10 | | 1.05 | 1.042 |
| Test Example 39-11 | | 1.10 | 1.059 |
| Test Example 39-12 | | 1.15 | 1.074 |
| Test Example 39-13 | | 1.20 | 1.082 |
| Test Example 39-14 | | 1.40 | 1.067 |
| Test Example 39-15 | | 1.70 | 1.052 |
| Test Example 39-16 | | 2.00 | 1.043 |

Figure 21A:
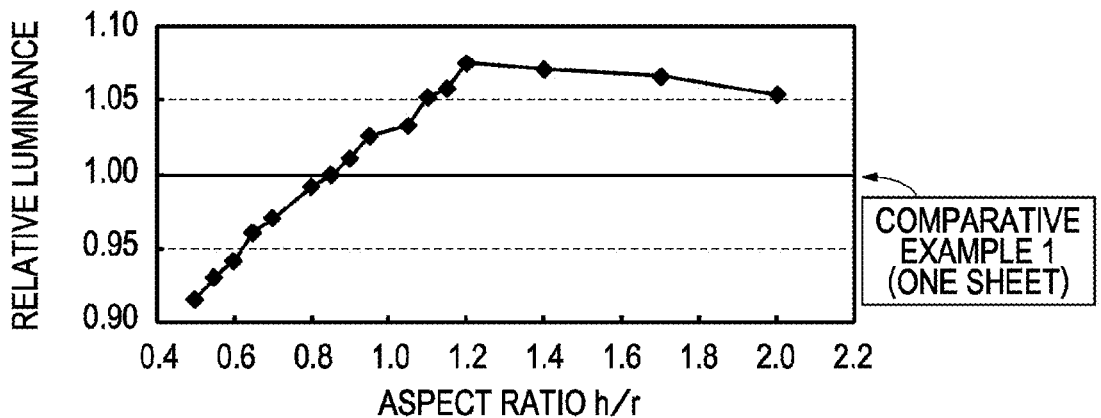
FIG. 21A is a graph illustrating luminance characteristics of diffusion sheets of Test Examples 37-1 through 37-16.
Figure 21B:
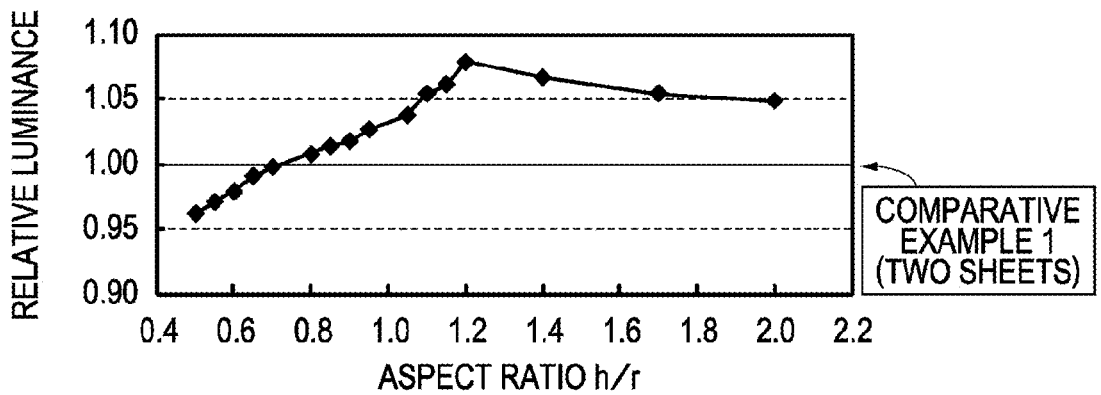
FIG. 21B is a graph illustrating luminance characteristics of diffusion sheets of Test Examples 38-1 through 38-16.
Figure 21C:
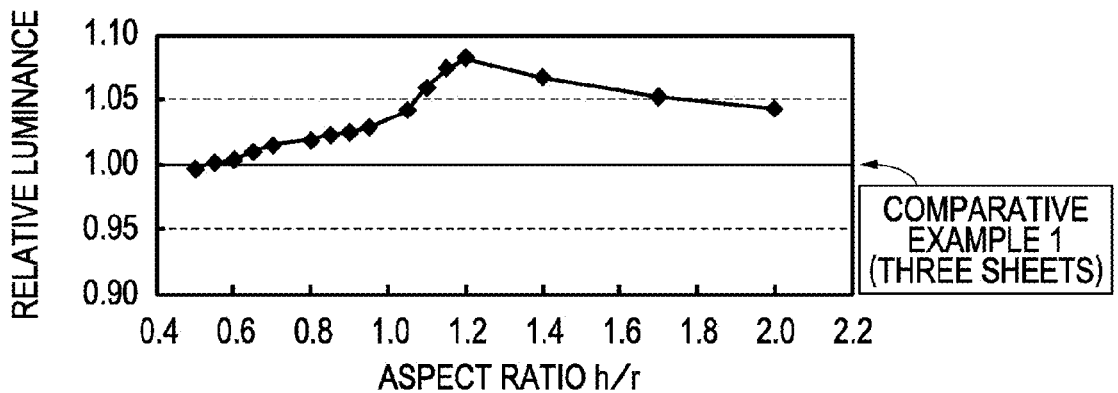
FIG. 21C is a graph illustrating luminance characteristics of diffusion sheets of Test Examples 39-1 through 39-16.

From FIGS. 21A through 21C, the followings are understood.

In a case that the number of diffusion sheets is one, the luminance similar to or more than that of the diffusion sheet in Comparative Example 1 can be obtained when the aspect ratio h/r is not less than 0.85.

In a case that the number of diffusion sheets is two, the luminance more than that of the diffusion sheet in Comparative Example 1 can be obtained when the aspect ratio h/r is not less than 0.80.

In a case that the number of diffusion sheets is three, the luminance almost equivalent to or more than that of the diffusion sheet in Comparative Example 1 can be obtained when the aspect ratio h/r is more than 0.5.

When diffusion sheets similar to those in Test Examples 36-1 through 39-16 were fabricated actually to evaluate the luminance, it was confirmed that the luminance of the actually fabricated samples had tendency similar to the diffusion sheets in Test Examples 36-1 through 39-16.

According to the findings obtained by the present inventors from the experiments, the transferability of the structures can be improved by establishing the aspect ratio h/r of the structures as not more than 1.50.

From above, in a case of using one of the diffusion sheets, the aspect ratio h/r is preferably more than 0.85 and not more than 1.50.

In a case of using two of the diffusion sheets by overlapping, the aspect ratio h/r is preferably more than 0.80 and not more than 1.50.

In a case of using three of the diffusion sheets by overlapping, the aspect ratio h/r is preferably more than 0.50 and not more than 1.50.

Example 6-1

Similar to Example 1 other than modifying the spherical diameter, the variation of heights, the aspect ratio, and the filling factor into the values shown in Table 6, a diffusion sheet was fabricated.

Figure 22:
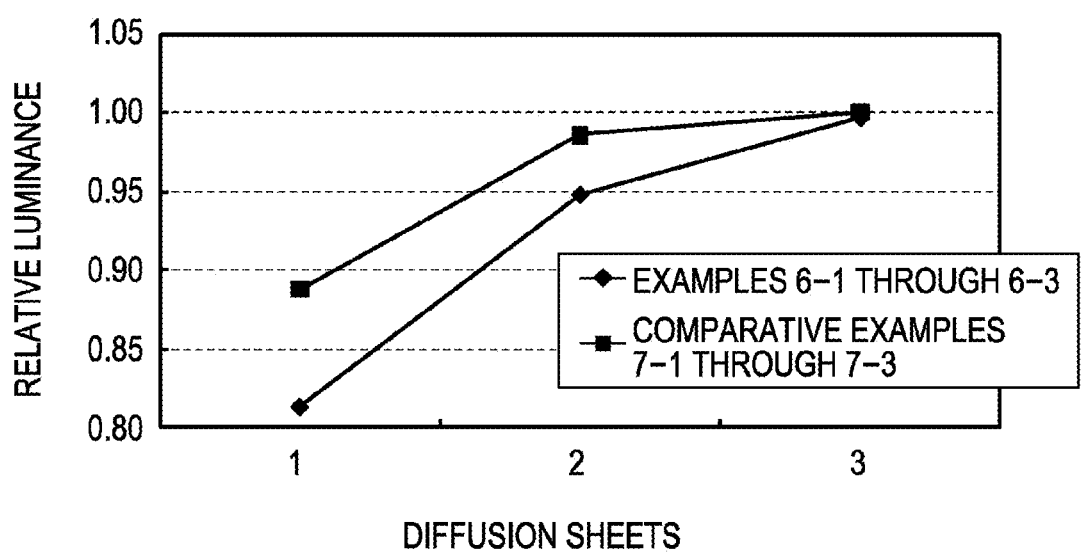
FIG. 22 is a graph illustrating luminance characteristics of diffusion sheets of Examples 6-1 through 6-3 and Comparative Examples 7-1 through 7-3.

One diffusion sheet obtained in the manner described above was located on a backlight unit composed of the light sources, the reflective film, and a light guide, not shown, and the luminance was measured with a luminance meter (manufactured by Topcon Corporation, product name: BM-7). The results are illustrated in FIG. 22 as relative luminance. The luminance is indicated in the relative luminance by reference to the luminance of Comparative Example 7-3 described later.

Example 6-2

Firstly, two diffusion sheets similar to those of Example 6-1 were fabricated. Next, similar to Example 6-1 other than locating the fabricated two diffusion sheets on a backlight unit, the luminance was measured. The results are illustrated in FIG. 22 as relative luminance.

Example 6-3

Firstly, three diffusion sheets similar to Example 6-1 were fabricated. Next, similar to Example 6-1 other than locating the fabricated three diffusion sheets on a backlight unit, the luminance was measured. The results were illustrated in FIG. 22 as relative luminance.

Comparative Example 7-1

One diffusion sheet was fabricated fully similar to Comparative Example 1. Next, similar to Example 6-1 other than locating the fabricated one diffusion sheet on a backlight unit, the luminance was measured. The results are illustrated in FIG. 22 as relative luminance.

Comparative Example 7-2

Firstly, two diffusion sheets similar to Comparative Example 7-1 were fabricated. Next, similar to Comparative Example 7-1 other than locating the fabricated two diffusion sheets on a backlight unit, the luminance was measured. The results are illustrated in FIG. 22 as relative luminance.

Comparative Example 7-3

Firstly, three diffusion sheets similar to Comparative Example 7-1 were fabricated. Next, similar to Comparative Example 7-1 other than locating the fabricated three diffusion sheets on a backlight unit, the luminance was measured. The results are illustrated in FIG. 22 as "1" in relative luminance to be the reference.

Table 6 shows the configuration and the relative luminance of the diffusion sheets in Examples 6-1 through 6-3 and Comparative Examples 7-1 through 7-3.

TABLE 6

| | Bottom face average diameter [μm] | Height variation [%] | Aspect ratio | Filling factor [%] | Diffusion sheets | Relative luminance |
|---|---|---|---|---|---|---|
| Example 6-1 | 70 | 4 | 0.5 | 63 | 1 | 0.813 |
| Example 6-2 | 70 | 4 | 0.5 | 63 | 2 | 0.948 |
| Example 6-3 | 70 | 4 | 0.5 | 63 | 3 | 0.997 |

TABLE 6-continued

|  | Bottom face average diameter [μm] | Height variation [%] | Aspect ratio | Filling factor [%] | Diffusion sheets | Relative luminance |
|---|---|---|---|---|---|---|
| Comparative Example 7-1 | 59 | 27.3 | 0.74 | 81 | 1 | 0.888 |
| Comparative Example 7-2 | 59 | 27.3 | 0.74 | 81 | 2 | 0.986 |
| Comparative Example 7-3 | 59 | 27.3 | 0.74 | 81 | 3 | 1.000 |

From FIG. 22, the followings are understood.

Although the luminance when using each one of the diffusion sheets in Comparative Examples 7-1 through 7-3 was higher compared to the diffusion sheets in Examples 6-1 through 6-3, an increase of the luminance is almost not expected when using three or more diffusion sheets in Comparative Examples 7-1 through 7-3. This is because the incident angle of the light introduced to a diffusion sheet is raised every time the light emitted from the light sources transmits a diffusion sheet and the recycling efficiency is decreased. In contrast, the diffusion sheets in Examples 6-1 through 6-3 has the luminance increased in proportion to the number of diffusion sheets, and an increase of the luminance is also expected when using three or more diffusion sheets. From a perspective of reducing unevenness of the light sources (for example, unevenness in the tube of a cold cathode fluorescent lamp), the aspect ratio is preferably not less than 0.5.

Example 7-1

Figure 23A:
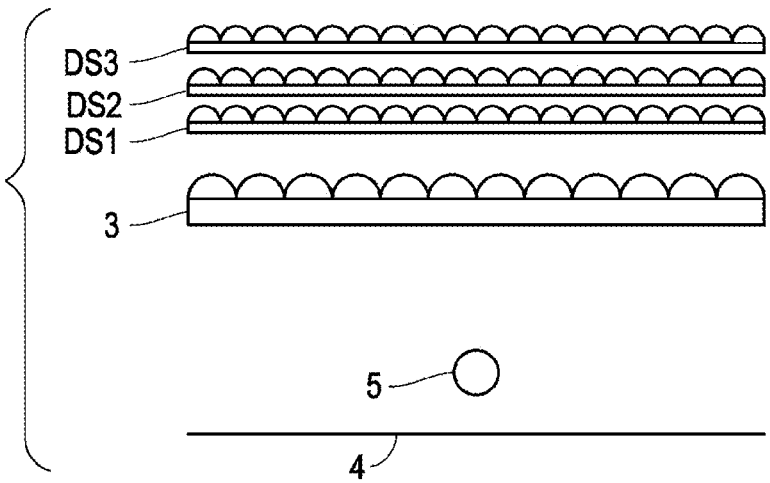
FIG. 23A is a schematic view illustrating a configuration of backlights of Examples 7-1 through 9-3.

FIG. 23A is a schematic view illustrating a configuration of a backlight in Example 7-1.

Firstly, similar to Example 1 other than modifying the spherical diameter, the variation of heights, the aspect ratio, and the filling factor into the values shown in Table 7, a first diffusion sheet DS1, a second diffusion sheet DS2, and a third diffusion sheet DS3 were fabricated.

Figure 23B:
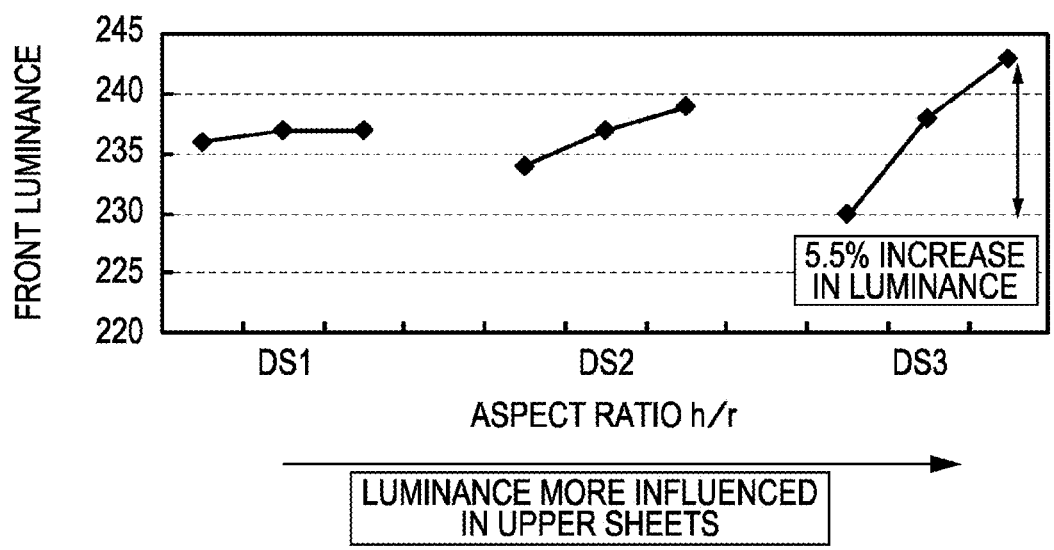
FIG. 23B is a graph illustrating luminance characteristics of the backlights of Examples 7-1 through 9-3.

Next, the diffusion sheets DS1 through DS3 in the manner described above were located on a respective backlight unit composed of the light sources 5, the reflective film 4, and the diffuser panel 3, and the luminance was measured with a luminance meter (manufactured by Topcon Corporation, product name: BM-7). The results are illustrated in FIG. 23B.

Example 7-2

Similar to Example 7-1 other than modifying the spherical diameter, the variation of heights, the aspect ratio, and the filling factor of the diffusion sheet DS1 at front most from the light sources into the values shown in Table 7, the luminance was measured. The results are illustrated in FIG. 23B.

Example 7-3

Similar to Example 7-1 other than modifying the spherical diameter, the variation of heights, the aspect ratio, and the filling factor of the diffusion sheet DS1 at front most from the light sources into the values shown in Table 7, the luminance was measured. The results are illustrated in FIG. 23B.

Example 8-1

FIG. 23A is a schematic view illustrating a configuration of a backlight in Example 8-1.

Firstly, similar to Example 7-1 other than modifying the spherical diameter, the variation of heights, the aspect ratio, and the filling factor into the values shown in Table 7, a first diffusion sheet DS1, a second diffusion sheet DS2, and a third diffusion sheet DS3 were fabricated.

Next, the diffusion sheets DS1 through DS3 obtained in the manner described above were located on a backlight unit composed of the light sources 5, the reflective film 4, and the diffuser panel 3, and the luminance was measured with a luminance meter (manufactured by Topcon Corporation, product name: BM-7). The results are illustrated in FIG. 23B.

Example 8-2

Similar to Example 8-1 other than modifying the spherical diameter, the variation of heights, the aspect ratio, and the filling factor of the diffusion sheet DS2 at second from the light sources into the values shown in Table 7, the luminance was measured. The results are illustrated in FIG. 23B.

Example 8-3

Similar to Example 8-1 other than modifying the spherical diameter, the variation of heights, the aspect ratio, and the filling factor of the diffusion sheet DS2 at second from the light sources into the values shown in Table 7, the luminance was measured. The results are illustrated in FIG. 23B.

Example 9-1

FIG. 23A is a schematic view illustrating a configuration of a backlight in Example 9-1.

Firstly, similar to Example 7-1 other than modifying the spherical diameter, the variation of heights, the aspect ratio, and the filling factor into the values shown in Table 7, a first diffusion sheet DS1, a second diffusion sheet DS2, and a third diffusion sheet DS3 were fabricated.

Next, the diffusion sheets DS1 through DS3 obtained in the manner described above were located on a backlight unit composed of the light sources 5, the reflective film 4, and the diffuser panel 3, and the luminance was measured with a luminance meter (manufactured by Topcon Corporation, product name: BM-7). The results are illustrated in FIG. 23B.

Example 9-2

Similar to Example 9-1 other than modifying the spherical diameter, the variation of heights, the aspect ratio, and the filling factor of the diffusion sheet DS3 at backmost from the light sources into the values shown in Table 7, the luminance was measured. The results are illustrated in FIG. 23B.

Example 9-3

Similar to Example 9-1 other than modifying the spherical diameter, the variation of heights, the aspect ratio, and the filling factor of the diffusion sheet DS3 at backmost from the light sources into the values shown in Table 7, the luminance was measured. The results are illustrated in FIG. 23B.

Table 7 shows the configuration and the relative luminance of the diffusion sheets in Examples 7-1 through 9-3

TABLE 7

| | Diffusion sheet | Bottom face average diameter [μm] | Height variation [%] | Aspect ratio | Filling factor [%] | Luminance |
|---|---|---|---|---|---|---|
| Example 7-1 | DS1 | 72 | 4 | 0.64 | 66 | 236 |
| | DS2 | General DS for effect confirmation | | | | |
| | DS3 | General DS for effect confirmation | | | | |
| Example 7-2 | DS1 | 72 | 4 | 0.75 | 66 | 237 |
| | DS2 | General DS for effect confirmation | | | | |
| | DS3 | General DS for effect confirmation | | | | |
| Example 7-3 | DS1 | 72 | 4 | 0.83 | 66 | 237 |
| | DS2 | General DS for effect confirmation | | | | |
| | DS3 | General DS for effect confirmation | | | | |
| Example 8-1 | DS1 | General DS for effect confirmation | | | | 234 |
| | DS2 | 72 | 4 | 0.64 | 66 | |
| | DS3 | General DS for effect confirmation | | | | |
| Example 8-2 | DS1 | General DS for effect confirmation | | | | 237 |
| | DS2 | 72 | 4 | 0.75 | 66 | |
| | DS3 | General DS for effect confirmation | | | | |
| Example 8-3 | DS1 | General DS for effect confirmation | | | | 239 |
| | DS2 | 72 | 4 | 0.83 | 66 | |
| | DS3 | General DS for effect confirmation | | | | |
| Example 9-1 | DS1 | General DS for effect confirmation | | | | 230 |
| | DS2 | General DS for effect confirmation | | | | |
| | DS3 | 72 | 4 | 0.64 | 66 | |
| Example 9-2 | DS1 | General DS for effect confirmation | | | | 238 |
| | DS2 | General DS for effect confirmation | | | | |
| | DS3 | 72 | 4 | 0.75 | 66 | |
| Example 9-3 | DS1 | General DS for effect confirmation | | | | 243 |
| | DS2 | General DS for effect confirmation | | | | |
| | DS3 | 72 | 4 | 0.83 | 66 | |

DS: Diffusion sheet

From FIG. 23B, the followings are understood.

The increased ratio of the luminance change is largest in a case of changing the aspect ratio h/r of the diffusion sheet DS3 at backmost from the light sources. Specifically, by modifying the aspect ratio h/r of the diffusion sheet DS3 from 0.65 to 0.83, the luminance can be increased approximately at 5.5%.

From above, in a case of using a plurality of diffusion sheets, by establishing the aspect ratio h/r of the diffusion sheet most distant from the light sources as largest, the luminance can be effectively increased.

Although Examples described above show the results of evaluating the luminance characteristics of backlights of either direct type or edge type, the diffusion sheet(s) in each Example mentioned above are confirmed that they have similar luminance improvement in backlights of both a direct type and an edge type.

Although specific descriptions are given above to embodiments of the present invention, embodiments of the present invention is not limited to the embodiments described above but various modifications are possible based on the technical spirit of embodiments of the present invention.

For example, the configurations, the methods, the shapes, the materials, the numerical values, and the like given in the embodiments described above are only for illustrative purposes, and configurations, methods, shapes, materials, numerical values, and the like different from those may also be used as desired.

In addition, configurations in the embodiments described above may be combined other without departing from the scope of the present application.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A diffusion sheet, comprising:
a substrate having a first principal surface and a second principal surface; and
structures each in a convex shape distributed irregularly on the first principal surface or the second principal surface of the substrate;
wherein a variation of heights of the structures K relative to an average height of the structures satisfies the relationship 0%<K≤10%,
wherein the structures have an aspect ratio h/r, where r denotes an average radius of the structures and h denotes an average height of the structures, of more than 0.85 and not more than 1.50,
wherein the structures have a filling factor of not less than 60% and not more than 80%, and
wherein at least one of the structures includes a main body in a partially spherical form, and a non-spherical base portion extending from a bottom face of the main body towards the substrate at an angle ranging from greater than 85 degrees to less than 90 degrees relative to the first principal surface.

2. A diffusion sheet, comprising:
a substrate having a first principal surface and a second principal surface; and
structures each in a convex shape distributed irregularly on the first principal surface or the second principal surface of the substrate;

wherein a variation of heights of the structures K relative to an average height of the structures satisfies the relationship 0%<K≤10%, the structures have an aspect ratio h/r, where r denotes an average radius of the structures and h denotes an average height of the structures, of more than 0.50 and not more than 1.50, wherein the structures have a filling factor of not less than 60% and not more than 80%, and wherein at least one of the structures includes a main body in a partially spherical form, and a non-spherical base portion extending from a bottom face of the main body towards the substrate at an angle ranging from greater than 85 degrees to less than 90 degrees relative to the first principal surface.

3. The diffusion sheet according to claim 1, wherein the structures have bottom faces in a circular shape, and an average diameter of the bottom faces in a circular shape is not less than 50 µm and not more than 100 µm.

4. The diffusion sheet according to claim 1, wherein the structures have bottom faces in a circular shape, and an average diameter of the bottom faces in a circular shape is not less than 20 µm and not more than 50 µm.

5. The diffusion sheet according to claim 1, wherein the base portion has an average length l of 0<l 20 µm.

6. The diffusion sheet according to claim 1, wherein the structures are formed integrally with the substrate, and the structures and the substrate contain an identical thermoplastic resin.

7. A backlight, comprising:
one or a plurality of light sources; and
one or a plurality of diffusion sheets;
wherein the diffusion sheets include
a substrate having a first principal surface and a second principal surface, and structures each in a convex shape distributed irregularly on the first principal surface or the second principal surface of the substrate,
wherein a variation of heights of the structures K relative to an average height of the structures satisfies the relationship 0%<K≤10%,
wherein the structures have an aspect ratio h/r, where r denotes an average radius of the structures and h denotes an average height of the structures, of more than 0.85 and not more than 1.50,
wherein the structures have a filling factor of not less than 60% and not more than 80%, and
wherein at least one of the structures includes a main body in a partially spherical form, and a non-spherical base portion extending from a bottom face of the main body towards the substrate at an angle ranging from greater than 85 degrees to less than 90 degrees relative to the first principal surface.

8. A backlight, comprising:
one or a plurality of light sources; and
a plurality of optical sheets;
wherein the plurality of optical sheets includes at least one diffusion sheet, wherein the diffusion sheet includes
a substrate having a first principal surface and a second principal surface, and structures each in a convex shape distributed irregularly on the first principal surface or the second principal surface of the substrate,
wherein a variation of heights of the structures K relative to an average height of the structures satisfies the relationship 0%<K≤10%,
wherein the structures have an aspect ratio h/r, where r denotes an average radius of the structures and h denotes an average height of the structures, of more than 0.50 and not more than 1.50,
wherein the structures have a filling factor of not less than 60% and not more than 80%, and
wherein at least one of the structures includes a main body in a partially spherical form, and a non-spherical base portion extending from a bottom face of the main body towards the substrate at an angle ranging from greater than 85 degrees to less than 90 degrees relative to the first principal surface.

9. The backlight according to claim 8, wherein the aspect ratio of the diffusion sheet disposed most distant from the light sources among the three or more diffusion sheets is largest among the three or more diffusion sheets.

10. A liquid crystal display device, comprising a backlight including:
a substrate having a first principal surface and a second principal surface; and
structures each in a convex shape distributed irregularly on the first principal surface or the second principal surface of the substrate;
wherein a variation of heights of the structures K relative to an average height of the structures satisfies the relationship 0%<K≤10%,
wherein the structures have an aspect ratio h/r, where r denotes an average radius of the structures and h denotes an average height of the structures, of more than 0.85 and not more than 1.50,
wherein the structures have a filling factor of not less than 60% and not more than 80%, and
wherein at least one of the structures includes a main body in a partially spherical form, and a non-spherical base portion extending from a bottom face of the main body towards the substrate at an angle ranging from greater than 85 degrees to less than 90 degrees relative to the first principal surface.

11. The diffusion sheet according to claim 1, wherein the structures are spaced apart from one another.

12. The diffusion sheet according to claim 2, wherein the structures are spaced apart from one another.

13. The backlight according to claim 7, wherein the structures are spaced apart from one another.

14. The backlight according to claim 8, wherein the structures are spaced apart from one another.

15. The liquid crystal display device according to claim 10, wherein the structures are spaced apart from one another.

* * * * *